(12) United States Patent
Hahn

(10) Patent No.: US 7,161,885 B2
(45) Date of Patent: Jan. 9, 2007

(54) COPY-PROTECTED COMPACT DISC AND METHOD FOR PRODUCING SAME

(75) Inventor: Yehuda Hahn, Ofra (IL)

(73) Assignee: Macrovision Corporation, Santa Clara, CA (US)

( * ) Notice: Subject to any disclaimer, the term of this patent is extended or adjusted under 35 U.S.C. 154(b) by 614 days.

(21) Appl. No.: 10/386,922

(22) Filed: Mar. 13, 2003

(65) Prior Publication Data

US 2004/0109393 A1    Jun. 10, 2004

Related U.S. Application Data

(63) Continuation-in-part of application No. 10/310,987, filed on Dec. 6, 2002.

(51) Int. Cl.
 *G11B 7/007* (2006.01)
(52) U.S. Cl. ............................... 369/53.21; 369/30.07; 369/59.25
(58) Field of Classification Search ..................... None
See application file for complete search history.

(56) References Cited

U.S. PATENT DOCUMENTS

| | | | |
|---|---|---|---|
| 5,065,388 A | | 11/1991 | Roth et al. |
| 5,325,352 A | * | 6/1994 | Matsumoto ............... 369/275.1 |
| 5,905,709 A | | 5/1999 | Blaukovitsch |
| 6,104,679 A | * | 8/2000 | Sollish ..................... 369/53.21 |
| 6,333,904 B1 | * | 12/2001 | Hashimoto ............... 369/53.44 |
| 6,425,098 B1 | * | 7/2002 | Sinquin et al. ............. 714/699 |
| 6,597,648 B1 | | 7/2003 | Yeo et al. |
| 6,715,122 B1 | | 3/2004 | Carson et al. |
| 6,928,040 B1 | * | 8/2005 | Christensen ............. 369/53.21 |
| 2002/0009033 A1 | | 1/2002 | Christensen |
| 2002/0114252 A1 | | 8/2002 | Inazawa |
| 2002/0159591 A1 | | 10/2002 | Heylen et al. |
| 2002/0162058 A1 | | 10/2002 | Sinquin et al. |
| 2002/0186629 A1 | | 12/2002 | Winter et al. |
| 2003/0012375 A1 | | 1/2003 | Sako et al. |
| 2003/0133386 A1 | | 7/2003 | Hahn |
| 2003/0169878 A1 | | 9/2003 | Miles |
| 2005/0254386 A1 | * | 11/2005 | Shavit et al. ............. 369/53.21 |

FOREIGN PATENT DOCUMENTS

| | | |
|---|---|---|
| GB | 2 386 245 A | 9/2003 |
| GB | 2 402 802 A | 12/2004 |
| JP | 2003 141741 | 5/2003 |
| WO | WO 00/74053 A1 | 12/2000 |
| WO | WO 01/61695 A1 | 8/2001 |
| WO | WO 01/78074 A1 | 10/2001 |
| WO | WO 01/80546 | 10/2001 |
| WO | WO 02/075735 A1 | 9/2002 |

(Continued)

OTHER PUBLICATIONS

"Data interchange on read-only 120 mm optical data disks (CD-ROM), second edition" Standard ECMA, XX, XX, No. ECMA-130, Jun. 1996, 49 pages.
ECMA: "Volume and File Structure of Read-Only and Write-Once Compact Disk Media for Information Interchange" Standard ECMA-168, XX, XX, Dec. 1994, pp. 1-128.

(Continued)

*Primary Examiner*—William Korzuch
*Assistant Examiner*—Michael V. Battaglia
(74) *Attorney, Agent, or Firm*—Victor Okumoto

(57) ABSTRACT

The present application relates to a copy-protected compact disc and a method for producing the optical disc and preventing unauthorized copying. The contents of at least one of the lead-in items in the optical disc are altered so that it is no longer uniform, thereby making a copied disc effectively corrupted and unplayable.

7 Claims, 23 Drawing Sheets

| C/A | TNO | PT | MI | SE | FR | ZE | PM | PS | PF | |
|---|---|---|---|---|---|---|---|---|---|---|
| 01 | 00 | 01 | 97 | 31 | 39 | 00 | 00 | 02 | 00 | |
| 01 | 00 | 01 | 97 | 31 | 40 | 00 | 00 | 02 | 00 | |
| 01 | 00 | 01 | 97 | 31 | 41 | 00 | 00 | 02 | 00 | |
| 01 | 00 | A0 | 97 | 31 | 42 | 00 | 01 | 00 | 00 | |
| 01 | 00 | A0 | 97 | 31 | 43 | 00 | 01 | 00 | 00 | |
| 01 | 00 | A0 | 97 | 31 | 44 | 00 | 01 | 00 | 00 | |
| 01 | 00 | A1 | 97 | 31 | 45 | 00 | 01 | 00 | 00 | |
| 01 | 00 | A1 | 97 | 31 | 46 | 00 | 01 | 00 | 00 | |
| 01 | 00 | A1 | 97 | 31 | 47 | 00 | 01 | 00 | 00 | |
| 01 | 00 | A2 | 97 | 31 | 48 | 00 | 97 | 31 | 48 | |
| 01 | 00 | A2 | 97 | 31 | 49 | 00 | 97 | 31 | 48 | |
| 01 | 00 | A2 | 97 | 31 | 50 | 00 | 97 | 31 | 48 | |
| 01 | 00 | 01 | 97 | 31 | 51 | 00 | 00 | 02 | 00 | |
| 01 | 00 | 01 | 97 | 31 | 52 | 00 | 00 | 02 | 00 | |
| 01 | 00 | 01 | 97 | 31 | 53 | 00 | 00 | 02 | 00 | (a) |
| 01 | 00 | A0 | 97 | 31 | 54 | 00 | 01 | 00 | 00 | |
| 01 | 00 | A0 | 97 | 31 | 55 | 00 | 01 | 00 | 00 | |
| 01 | 00 | A0 | 97 | 31 | 56 | 00 | 01 | 00 | 00 | |
| 01 | 00 | A1 | 97 | 31 | 57 | 00 | 01 | 00 | 00 | |
| 01 | 00 | A1 | 97 | 31 | 58 | 00 | 01 | 00 | 00 | |
| 01 | 00 | A1 | 97 | 31 | 59 | 00 | 01 | 00 | 00 | |
| 01 | 00 | A2 | 97 | 31 | 60 | 00 | 97 | 31 | 60 | |
| 01 | 00 | A2 | 97 | 31 | 61 | 00 | 97 | 31 | 60 | |
| 01 | 00 | A2 | 97 | 31 | 62 | 00 | 97 | 31 | 60 | |

FOREIGN PATENT DOCUMENTS

| | | |
|---|---|---|
| WO | WO 03/034424 A2 | 4/2003 |
| WO | WO 03/077246 A2 | 9/2003 |
| WO | WO 03/088241 | 10/2003 |
| WO | WO 2004/008456 | 1/2004 |

OTHER PUBLICATIONS

PCT Search Report for PCT/IL 02/00989 dated Jun. 25, 2003, 2 pages.
PCT Search Report for PCT/IL2004/000239 dated Aug. 31, 2004, 2 pages.

* cited by examiner

| CTRL | PT | PTIME | | |
|---|---|---|---|---|
| | | PMIN | PSEC | PFRAME |
| AUDIO | 1 | 0 | 2 | 0 |
| AUDIO | 1 | 0 | 2 | 0 |
| AUDIO | 1 | 0 | 2 | 0 |
| AUDIO | 2 | 3 | 2 | 0 |
| AUDIO | 2 | 3 | 2 | 0 |
| AUDIO | 2 | 3 | 2 | 0 |
| AUDIO | 3 | 6 | 2 | 0 |
| AUDIO | 3 | 6 | 2 | 0 |
| AUDIO | 3 | 6 | 2 | 0 |
| AUDIO | 1 | 0 | 2 | 0 |
| AUDIO | 1 | 0 | 2 | 0 |
| AUDIO | 1 | 0 | 2 | 0 |
| AUDIO | 2 | 3 | 2 | 0 |
| AUDIO | 2 | 3 | 2 | 0 |
| AUDIO | 2 | 3 | 2 | 0 |
| AUDIO | 3 | 6 | 2 | 0 |
| AUDIO | 3 | 6 | 2 | 0 |
| AUDIO | 3 | 6 | 2 | 0 |

CTRL

FIG 2 (Prior Art)

| C/A | TNO | PT | MI | SE | FR | ZE | PM | PS | PF |
|---|---|---|---|---|---|---|---|---|---|
| 01 | 00 | 01 | 97 | 31 | 39 | 00 | 00 | 02 | 00 |
| 01 | 00 | 01 | 97 | 31 | 40 | 00 | 00 | 02 | 00 |
| 01 | 00 | 01 | 97 | 31 | 41 | 00 | 00 | 02 | 00 |
| 01 | 00 | 02 | 97 | 31 | 45 | 00 | 01 | 02 | 00 |
| 01 | 00 | 02 | 97 | 31 | 46 | 00 | 01 | 02 | 00 |
| 01 | 00 | 02 | 97 | 31 | 47 | 00 | 01 | 02 | 00 |
| 01 | 00 | 03 | 97 | 31 | 51 | 00 | 02 | 02 | 00 |
| 01 | 00 | 03 | 97 | 31 | 52 | 00 | 02 | 02 | 00 |
| 01 | 00 | 03 | 97 | 31 | 53 | 00 | 02 | 02 | 00 |
| 01 | 00 | A0 | 97 | 32 | 18 | 00 | 01 | 00 | 00 |
| 01 | 00 | A0 | 97 | 32 | 19 | 00 | 01 | 00 | 00 |
| 01 | 00 | A0 | 97 | 32 | 20 | 00 | 01 | 00 | 00 |
| 01 | 00 | A1 | 97 | 32 | 24 | 00 | 09 | 00 | 00 |
| 01 | 00 | A1 | 97 | 32 | 25 | 00 | 09 | 00 | 00 |
| 01 | 00 | A1 | 97 | 32 | 26 | 00 | 09 | 00 | 00 |
| 01 | 00 | A2 | 97 | 32 | 30 | 00 | 09 | 00 | 00 |
| 01 | 00 | A2 | 97 | 32 | 31 | 00 | 09 | 00 | 00 |
| 01 | 00 | A2 | 97 | 32 | 32 | 00 | 09 | 00 | 00 |

Legend:
C/A  CTRL/ADR
TNO  TNO
PT   POINT
MI   MIN
SE   SEC
FR   FRAME
ZE   ZERO
PM   PMIN
PS   PSEC
PF   PFRAME

FIG 3 (Prior Art)

| C/A | TNO | PT | MI | SE | FR | ZE | PM | PS | PF |
|---|---|---|---|---|---|---|---|---|---|
| 01 | 00 | 01 | 97 | 31 | 39 | 00 | 00 | 02 | 00 |
| 01 | 00 | 01 | 97 | 31 | 40 | 00 | 00 | 02 | 00 |
| 01 | 00 | 01 | 97 | 31 | 41 | 00 | 00 | 02 | 00 |
| 05 | 00 | B0 | 11 | 30 | 00 | 02 | 11 | 34 | 27 |
| 05 | 00 | B0 | 11 | 30 | 00 | 02 | 11 | 34 | 27 |
| 05 | 00 | B0 | 11 | 30 | 00 | 02 | 11 | 34 | 27 |
| 01 | 00 | 02 | 97 | 31 | 45 | 00 | 01 | 02 | 00 |
| 01 | 00 | 02 | 97 | 31 | 46 | 00 | 01 | 02 | 00 |
| 01 | 00 | 02 | 97 | 31 | 47 | 00 | 01 | 02 | 00 |
| 05 | 00 | C0 | 80 | 00 | 00 | 00 | 97 | 18 | 06 |
| 05 | 00 | C0 | 80 | 00 | 00 | 00 | 97 | 18 | 06 |
| 05 | 00 | C0 | 80 | 00 | 00 | 00 | 97 | 18 | 06 |
| 01 | 00 | 03 | 97 | 31 | 51 | 00 | 02 | 02 | 00 |
| 01 | 00 | 03 | 97 | 31 | 52 | 00 | 02 | 02 | 00 |
| 01 | 00 | 03 | 97 | 31 | 53 | 00 | 02 | 02 | 00 |
| . | | | | | | | | | |
| 05 | 00 | B0 | 11 | 30 | 00 | 02 | 11 | 34 | 27 |
| 05 | 00 | B0 | 11 | 30 | 00 | 02 | 11 | 34 | 27 |
| 05 | 00 | B0 | 11 | 30 | 00 | 02 | 11 | 34 | 27 |
| 01 | 00 | A0 | 97 | 32 | 18 | 00 | 01 | 00 | 00 |
| 01 | 00 | A0 | 97 | 32 | 19 | 00 | 01 | 00 | 00 |
| 01 | 00 | A0 | 97 | 32 | 20 | 00 | 01 | 00 | 00 |
| 05 | 00 | C0 | 80 | 00 | 00 | 00 | 97 | 18 | 06 |
| 05 | 00 | C0 | 80 | 00 | 00 | 00 | 97 | 18 | 06 |
| 05 | 00 | C0 | 80 | 00 | 00 | 00 | 97 | 18 | 06 |
| 01 | 00 | A1 | 97 | 32 | 24 | 00 | 09 | 00 | 00 |
| 01 | 00 | A1 | 97 | 32 | 25 | 00 | 09 | 00 | 00 |
| 01 | 00 | A1 | 97 | 32 | 26 | 00 | 09 | 00 | 00 |
| 05 | 00 | B0 | 11 | 30 | 00 | 02 | 11 | 34 | 27 |
| 05 | 00 | B0 | 11 | 30 | 00 | 02 | 11 | 34 | 27 |
| 05 | 00 | B0 | 11 | 30 | 00 | 02 | 11 | 34 | 27 |
| 01 | 00 | A2 | 97 | 32 | 30 | 00 | 09 | 00 | 00 |
| 01 | 00 | A2 | 97 | 32 | 31 | 00 | 09 | 00 | 00 |
| 01 | 00 | A2 | 97 | 32 | 32 | 00 | 09 | 00 | 00 |
| 05 | 00 | C0 | 80 | 00 | 00 | 00 | 97 | 18 | 06 |
| 05 | 00 | C0 | 80 | 00 | 00 | 00 | 97 | 18 | 06 |
| 05 | 00 | C0 | 80 | 00 | 00 | 00 | 97 | 18 | 06 |

FIG 4 (Prior Art)

| CTRL | ADR | POINT | MIN | SEC | FRAME | ZERO | PMIN | PSEC | PFRAME | CRC |
|------|-----|-------|-----|-----|-------|------|------|------|--------|-----|
| *    | *   | *     |     |     |       |      | *    | *    | *      |     |

Item 1

| CTRL | ADR | POINT | MIN | SEC | FRAME | ZERO | PMIN | PSEC | PFRAME | CRC |
|------|-----|-------|-----|-----|-------|------|------|------|--------|-----|
| *    | *   | *     |     |     |       |      | *    | *    | *      |     |

Item 2

FIG. 5 (Prior Art)

| CTRL | PT | PTIME | | |
|------|----|----|------|--------|
|      |    | PMIN | PSEC | PFRAME |
| .    |    |      |      |        |
| .    |    |      |      |        |
| .    |    |      |      |        |
| AUDIO | 1 | 0 | 2 | 0 |
| DATA (a) | 1 | 0 | 2 | 0 |
| AUDIO | 1 | 0 | 2 | 0 |
| .    |    |      |      |        |
| .    |    |      |      |        |
| .    |    |      |      |        |

— Misleading item

FIG 6

| CRTL | PT | PTIME | | | CRC |
|------|----|----|------|--------|-----|
|      |    | PMIN | PSEC | PFRAME |     |
| .    |    |      |      |        |     |
| .    |    |      |      |        |     |
| .    |    |      |      |        |     |
| AUDIO | 1 | 0 | 2 | 0 | 45 |
| AUDIO | 1 | 0 | 2 | 0 | 45 |
| AUDIO | 1 | 0 | 2 | 0 | 5 (a) |
| .    |    |      |      |        |     |
| .    |    |      |      |        |     |

— Invalid item

FIG 7

| CTRL | PT | PTIME | | |
|---|---|---|---|---|
| | | PMIN | PSEC | PFRAME |
| AUDIO | 1 | 0 | 2 | 0 |
| AUDIO | 1 | 0 | 2 | 0 |
| AUDIO | 1 | 0 | 2 | 0 |
| AUDIO | 2 | 3 | 2 | 0 |
| AUDIO | 2 | 3 | 2 | 0 (a) |
| AUDIO | 2 | 3 | 2 | 0 |
| AUDIO | 3 | 6 | 2 | 0 |
| AUDIO | 3 | 6 | 2 | 0 |
| AUDIO | 3 | 6 | 2 | 0 |
| AUDIO | 1 | 0 | 2 | 0 |
| AUDIO | 1 | 0 | 2 | 0 |
| AUDIO | 1 | 0 | 2 | 0 |
| DATA | 2 | 3 | 2 | 0 |
| DATA | 2 | 3 | 2 | 0 (b) |
| DATA | 2 | 3 | 2 | 0 |
| AUDIO | 3 | 6 | 2 | 0 |
| AUDIO | 3 | 6 | 2 | 0 |
| AUDIO | 3 | 6 | 2 | 0 |

- TOC *i* (rows with AUDIO 2)
- Misleading item (DATA 2 ... 0 (b))
- TOC *i+1* (final AUDIO 3 rows)

FIG 8

| CTRL | PT | PTIME | | |
|---|---|---|---|---|
| | | PMIN | PSEC | PFRAME |
| AUDIO | 1 | 0 | 2 | 0 |
| AUDIO | 1 | 0 | 2 | 0 |
| AUDIO | 1 | 0 | 2 | 0 |
| AUDIO | 2 | 3 | 2 | 0 |
| AUDIO | 2 | 3 | 2 | 0 |
| AUDIO | 2 | 3 | 2 | 0 |
| AUDIO | 3 | 6 | 2 | 0 |
| AUDIO | 3 | 6 | 2 | 0 |
| AUDIO | 3 | 6 | 2 | 0 |
| AUDIO | 1 | 0 | 2 | 0 |
| AUDIO | 1 | 0 | 2 | 0 |
| AUDIO | 1 | 0 | 2 | 0 |
| AUDIO | 3 (a) | 3 | 2 | 0 |
| AUDIO | 3 (a) | 3 | 2 | 0 |
| AUDIO | 3 (a) | 3 | 2 | 0 |
| AUDIO | 3 | 6 | 2 | 0 |
| AUDIO | 3 | 6 | 2 | 0 |
| AUDIO | 3 | 6 | 2 | 0 |

- TOC *i*
- Misleading item
- TOC *i* + 1

FIG 9

| ADR | PT | PTIME | | |
|---|---|---|---|---|
| | | PMIN | PSEC | PFRAME |
| . | | | | |
| . | | | | |
| . | | | | |
| 1 | 1 | 0 | 2 | 0 |
| 1 | 1 | 0 | 2 | 0 |
| 1 | 1 | 0 | 2 | 0 |
| 1 | 2 | 3 | 2 | 0 |
| 1 | 2 | 3 | 2 | 0 |
| 1 | 2 | 3 | 2 | 0 |
| 1 | 3 | 6 | 2 | 0 |
| 1 | 3 | 6 | 2 | 0 |
| 1 | 3 | 6 | 2 | 0 |
| 1 | 1 | 0 | 2 | 0 |
| 1 | 1 | 0 | 2 | 0 |
| 1 | 1 | 0 | 2 | 0 |
| 8 | 2 | 3 | 2 | 0 |
| 8 (a) | 2 | 3 | 2 | 0 |
| 8 | 2 | 3 | 2 | 0 |
| 1 | 3 | 6 | 2 | 0 |
| 1 | 3 | 6 | 2 | 0 |
| 1 | 3 | 6 | 2 | 0 |
| . | | | | |
| . | | | | |
| . | | | | |

— TOC *i*

— Misleading item

— TOC *i*

FIG 10

| CTRL | PT | PTIME | | |
|---|---|---|---|---|
| | | PMIN | PSEC | PFRAME |
| . | | | | |
| . | | | | |
| . | | | | |
| AUDIO | 1 | 0 | 2 | 0 |
| DATA | 1 | 0 | 2 | 0 (a) |
| AUDIO | 1 | 0 | 2 | 0 |
| AUDIO | 2 | 3 | 2 | 0 |
| AUDIO | 2 | 3 | 2 | 0 |
| AUDIO | 2 | 3 | 2 | 0 |
| AUDIO | 3 | 6 | 2 | 0 |
| AUDIO | 3 | 6 | 2 | 0 |
| AUDIO | 3 | 6 | 2 | 0 |
| AUDIO | 1 | 0 | 2 | 0 |
| AUDIO | 1 | 0 | 2 | 0 |
| AUDIO | 1 | 0 | 2 | 0 |
| DATA | 2 | 3 | 2 | 0 |
| DATA | 2 | 3 | 2 | 0 (b) |
| DATA | 2 | 3 | 2 | 0 |
| AUDIO | 3 | 6 | 2 | 0 |
| AUDIO | 3 | 6 | 2 | 0 |
| AUDIO | 3 | 6 | 2 | 0 |
| . | | | | |
| . | | | | |
| . | | | | |

Annotations: Row 2 — Misleading item; Rows 4–6 — TOC $i$; Rows 13–15 — Misleading items; Rows 16–18 — TOC $i+1$

| | C/A | TNO | PT | MI | SE | FR | ZE | AM | AS | AF | |
|---|---|---|---|---|---|---|---|---|---|---|---|
| 126 { | 41 | 00 | 01 | 97 | 31 | 39 | 00 | 00 | 02 | 00 | |
| | 01 | 00 | 01 | 97 | 31 | 40 | 00 | 00 | 02 | 00 | |
| | 41 | 00 | 01 | 97 | 31 | 41 | 00 | 00 | 02 | 00 | |
| | 01 | 00 | 02 | 97 | 31 | 45 | 00 | 01 | 02 | 00 | |
| | 01 | 00 | 02 | 97 | 31 | 46 | 00 | 01 | 02 | 00 | |
| | 01 | 00 | 02 | 97 | 31 | 47 | 00 | 01 | 02 | 00 | |
| | 01 | 00 | 03 | 97 | 31 | 51 | 00 | 02 | 02 | 00 | |
| | 01 | 00 | 03 | 97 | 31 | 52 | 00 | 02 | 02 | 00 | |
| | 01 | 00 | 03 | 97 | 31 | 53 | 00 | 02 | 02 | 00 | |
| 128 { | 01 | 00 | A0 | 97 | 32 | 18 | 00 | 01 | 00 | 00 | |
| | 01 | 00 | A0 | 97 | 32 | 19 | 00 | 01 | 00 | 00 | (a) |
| | 01 | 00 | A0 | 97 | 32 | 20 | 00 | 01 | 00 | 00 | |
| 130 { | 41 | 00 | A1 | 97 | 32 | 24 | 00 | 09 | 00 | 00 | |
| | 01 | 00 | A1 | 97 | 32 | 25 | 00 | 09 | 00 | 00 | (b) |
| | 41 | 00 | A1 | 97 | 32 | 26 | 00 | 09 | 00 | 00 | |
| 132 { | 01 | 00 | A2 | 97 | 32 | 30 | 00 | 09 | 00 | 00 | |
| | 48 | 00 | A2 | 97 | 32 | 31 | 00 | 09 | 00 | 00 | (c) |
| | 48 | 00 | A2 | 97 | 32 | 32 | 00 | 09 | 00 | 00 | |

FIG. 17

| C/A | TNO | PT | MI | SE | FR | ZE | AM | AS | AF | | |
|-----|-----|----|----|----|----|----|----|----|----|----|----|
| 41 | 00 | 01 | 97 | 31 | 39 | 00 | 00 | 02 | 00 | | |
| 01 | 00 | 01 | 97 | 31 | 40 | 00 | 00 | 02 | 00 | | 138 |
| 41 | 00 | 01 | 97 | 31 | 41 | 00 | 00 | 02 | 00 | | |
| 05 | 00 | B0 | 11 | 30 | 00 | 02 | 11 | 34 | 27 | | |
| 05 | 00 | B0 | 11 | 30 | 00 | 02 | 11 | 34 | 27 | (a) | 136 |
| 05 | 00 | B0 | 11 | 30 | 00 | 02 | 11 | 34 | 27 | | |
| 41 | 00 | 02 | 97 | 31 | 45 | 00 | 01 | 02 | 00 | | |
| 01 | 00 | 02 | 97 | 31 | 46 | 00 | 01 | 02 | 00 | | |
| 41 | 00 | 02 | 97 | 31 | 47 | 00 | 01 | 02 | 00 | | |
| 05 | 00 | C0 | 80 | 00 | 00 | 00 | 97 | 18 | 06 | | |
| 05 | 00 | C0 | 80 | 00 | 00 | 00 | 97 | 18 | 06 | | 140 |
| 05 | 00 | C0 | 80 | 00 | 00 | 00 | 97 | 18 | 06 | | |
| 01 | 00 | 03 | 97 | 31 | 51 | 00 | 05 | 02 | 00 | | |
| 01 | 00 | 03 | 97 | 31 | 52 | 00 | 02 | 02 | 00 | | 142 |
| 01 | 00 | 03 | 97 | 31 | 53 | 00 | 05 | 02 | 00 | | |
| 05 | 00 | B0 | 11 | 30 | 00 | 02 | 16 | 34 | 27 | | |
| 05 | 00 | B0 | 11 | 30 | 00 | 02 | 11 | 34 | 27 | (b) | 146 |
| 05 | 00 | B0 | 11 | 30 | 00 | 02 | 16 | 34 | 27 | | |
| 01 | 00 | 04 | 97 | 31 | 57 | 00 | 04 | 02 | 00 | | |
| 01 | 00 | 04 | 97 | 32 | 58 | 00 | 03 | 00 | 00 | | 148 |
| 01 | 00 | 04 | 97 | 31 | 59 | 00 | 04 | 02 | 00 | | |
| 05 | 00 | C0 | 80 | 00 | 00 | 00 | 97 | 18 | 06 | | |
| 05 | 00 | C0 | 80 | 00 | 00 | 00 | 97 | 18 | 06 | | |
| 05 | 00 | C0 | 80 | 00 | 00 | 00 | 97 | 18 | 06 | | |
| 01 | 00 | 05 | 97 | 32 | 63 | 00 | 04 | 02 | 00 | | |
| 01 | 00 | 05 | 97 | 32 | 64 | 00 | 04 | 02 | 00 | | |
| 01 | 00 | 05 | 97 | 32 | 65 | 00 | 04 | 02 | 00 | | |
| 05 | 00 | B0 | 11 | 30 | 00 | 02 | 11 | 34 | 27 | | |
| 48 | 00 | CC | 11 | 30 | 00 | 02 | 11 | 34 | 27 | (c) | 150 |
| 48 | 00 | CC | 11 | 30 | 00 | 02 | 11 | 34 | 27 | | |
| 01 | 00 | 06 | 97 | 31 | 69 | 00 | 05 | 02 | 00 | | |
| 01 | 00 | 06 | 97 | 31 | 70 | 00 | 09 | 02 | 00 | | |
| 01 | 00 | 06 | 97 | 31 | 71 | 00 | 09 | 02 | 00 | | |

FIG. 18

| C/A | TNO | PT | MI | SE | FR | ZE | AM | AS | AF | |
|---|---|---|---|---|---|---|---|---|---|---|
| 01 | 00 | 01 | 97 | 31 | 39 | 00 | 00 | 02 | 00 | |
| 01 | 00 | 01 | 97 | 31 | 40 | 00 | 00 | 02 | 00 | |
| 01 | 00 | 01 | 97 | 31 | 41 | 00 | 00 | 02 | 00 | |
| 08 | 00 | B0 | 11 | 30 | 00 | 02 | 11 | 34 | 27 | |
| 08 | 00 | B0 | 11 | 30 | 00 | 02 | 11 | 34 | 27 | }154 |
| 08 | 00 | B0 | 11 | 30 | 00 | 02 | 11 | 34 | 27 | |
| 01 | 00 | 02 | 97 | 31 | 45 | 00 | 01 | 02 | 00 | |
| 01 | 00 | 02 | 97 | 31 | 46 | 00 | 01 | 02 | 00 | |
| 01 | 00 | 02 | 97 | 31 | 47 | 00 | 01 | 02 | 00 | |
| 05 | 00 | C0 | 80 | 00 | 00 | 00 | 97 | 18 | 06 | |
| 05 | 00 | C0 | 80 | 00 | 00 | 00 | 97 | 18 | 06 | |
| 05 | 00 | C0 | 80 | 00 | 00 | 00 | 97 | 18 | 06 | |
| 01 | 00 | 05 | 97 | 32 | 63 | 00 | 04 | 02 | 00 | |
| 01 | 00 | 05 | 97 | 32 | 64 | 00 | 04 | 02 | 00 | |
| 01 | 00 | 05 | 97 | 32 | 65 | 00 | 04 | 02 | 00 | |
| 08 | 00 | B0 | 11 | 30 | 00 | 02 | 11 | 34 | 27 | |
| 08 | 00 | B0 | 11 | 30 | 00 | 02 | 11 | 34 | 27 | |
| 08 | 00 | B0 | 11 | 30 | 00 | 02 | 11 | 34 | 27 | |
| 01 | 00 | 06 | 97 | 31 | 69 | 00 | 05 | 02 | 00 | |
| 01 | 00 | 06 | 97 | 31 | 70 | 00 | 09 | 02 | 00 | |
| 01 | 00 | 06 | 97 | 31 | 71 | 00 | 09 | 02 | 00 | |
| 05 | 00 | C0 | 80 | 00 | 00 | 00 | 97 | 18 | 06 | |
| 05 | 00 | C0 | 80 | 00 | 00 | 00 | 97 | 18 | 06 | |
| 05 | 00 | C0 | 80 | 00 | 00 | 00 | 97 | 18 | 06 | |
| 01 | 00 | 01 | 97 | 31 | 39 | 00 | 00 | 02 | 00 | |
| 01 | 00 | 01 | 97 | 31 | 40 | 00 | 00 | 02 | 00 | |
| 01 | 00 | 01 | 97 | 31 | 41 | 00 | 00 | 02 | 00 | |
| 08 | 00 | B0 | 11 | 30 | 00 | 02 | 11 | 34 | 27 | |
| 08 | 00 | B0 | 11 | 30 | 00 | 02 | 11 | 34 | 27 | |
| 08 | 00 | B0 | 11 | 30 | 00 | 02 | 11 | 34 | 27 | |
| 41 | 00 | 02 | 97 | 31 | 45 | 00 | 01 | 02 | 00 | |
| 41 | 00 | 02 | 97 | 31 | 46 | 00 | 01 | 02 | 00 | }152 |
| 41 | 00 | 02 | 97 | 31 | 47 | 00 | 01 | 02 | 00 | |

FIG. 19

| C/A | TNO | PT | MI | SE | FR | ZE | PM | PS | PF |
|-----|-----|-----|----|----|----|----|----|----|----|
| 01 | 00 | 01 | 97 | 31 | 39 | 00 | 00 | 02 | 00 |
| 01 | 00 | 01 | 97 | 31 | 40 | 00 | 00 | 02 | 00 |
| 01 | 00 | 01 | 97 | 31 | 41 | 00 | 00 | 02 | 00 |
| 01 | 00 | A0 | 97 | 31 | 42 | 00 | 01 | 00 | 00 |
| 01 | 00 | A0 | 97 | 31 | 43 | 00 | 01 | 00 | 00 |
| 01 | 00 | A0 | 97 | 31 | 44 | 00 | 01 | 00 | 00 |
| 01 | 00 | A1 | 97 | 31 | 45 | 00 | 01 | 00 | 00 |
| 01 | 00 | A1 | 97 | 31 | 46 | 00 | 01 | 00 | 00 |
| 01 | 00 | A1 | 97 | 31 | 47 | 00 | 01 | 00 | 00 |
| 01 | 00 | A2 | 97 | 31 | 48 | 00 | 97 | 31 | 48 |
| 01 | 00 | A2 | 97 | 31 | 49 | 00 | 97 | 31 | 48 |
| 01 | 00 | A2 | 97 | 31 | 50 | 00 | 97 | 31 | 48 |
| 01 | 00 | 01 | 97 | 31 | 51 | 00 | 00 | 02 | 00 |
| 01 | 00 | 01 | 97 | 31 | 52 | 00 | 00 | 02 | 00 |
| 01 | 00 | 01 | 97 | 31 | 53 | 00 | 00 | 02 | 00 |
| 01 | 00 | A0 | 97 | 31 | 54 | 00 | 01 | 00 | 00 |
| 01 | 00 | A0 | 97 | 31 | 55 | 00 | 01 | 00 | 00 |
| 01 | 00 | A0 | 97 | 31 | 56 | 00 | 01 | 00 | 00 |
| 01 | 00 | A1 | 97 | 31 | 57 | 00 | 01 | 00 | 00 |
| 01 | 00 | A1 | 97 | 31 | 58 | 00 | 01 | 00 | 00 |
| 01 | 00 | A1 | 97 | 31 | 59 | 00 | 01 | 00 | 00 |
| 01 | 00 | A2 | 97 | 31 | 60 | 00 | 97 | 31 | 60 |
| 01 | 00 | A2 | 97 | 31 | 61 | 00 | 97 | 31 | 60 |
| 01 | 00 | A2 | 97 | 31 | 62 | 00 | 97 | 31 | 60 |

| C/A | TNO | PT | MI | SE | FR | ZE | PM | PS | PF |
|-----|-----|----|----|----|----|----|----|----|----|
| 01 | 00 | 01 | 97 | 31 | 39 | 00 | 00 | 02 | 00 |
| 01 | 00 | 01 | 97 | 31 | 40 | 00 | 00 | 02 | 00 |
| 01 | 00 | 01 | 97 | 31 | 41 | 00 | 00 | 02 | 00 |
| 01 | 00 | A0 | 97 | 31 | 42 | 00 | 01 | 00 | 00 |
| 01 | 00 | A0 | 97 | 31 | 43 | 00 | 01 | 00 | 00 |
| 01 | 00 | A0 | 97 | 31 | 44 | 00 | 01 | 00 | 00 |
| 01 | 00 | A1 | 97 | 31 | 45 | 00 | 01 | 00 | 00 |
| 01 | 00 | A1 | 97 | 31 | 46 | 00 | 01 | 00 | 00 |
| 01 | 00 | A1 | 97 | 31 | 47 | 00 | 01 | 00 | 00 |
| 01 | 00 | A2 | 97 | 31 | 48 | 00 | 16 | 31 | 48 |
| 01 | 00 | A2 | 97 | 31 | 49 | 00 | 16 | 31 | 48 |
| 01 | 00 | A2 | 97 | 31 | 50 | 00 | 16 | 31 | 48 |
| 01 | 00 | 01 | 97 | 31 | 51 | 00 | 00 | 02 | 00 |
| 01 | 00 | 01 | 97 | 31 | 52 | 00 | 00 | 02 | 00 |
| 01 | 00 | 01 | 97 | 31 | 53 | 00 | 00 | 02 | 00 |
| 01 | 00 | A0 | 97 | 31 | 54 | 00 | 01 | 00 | 00 |
| 01 | 00 | A0 | 97 | 31 | 55 | 00 | 01 | 00 | 00 |
| 01 | 00 | A0 | 97 | 31 | 56 | 00 | 01 | 00 | 00 |
| 01 | 00 | A1 | 97 | 31 | 57 | 00 | 01 | 00 | 00 |
| 01 | 00 | A1 | 97 | 31 | 58 | 00 | 01 | 00 | 00 |
| 01 | 00 | A1 | 97 | 31 | 59 | 00 | 01 | 00 | 00 |
| 01 | 00 | A2 | 97 | 31 | 60 | 00 | 20 | 31 | 60 |
| 01 | 00 | A2 | 97 | 31 | 61 | 00 | 20 | 31 | 60 |
| 01 | 00 | A2 | 97 | 31 | 62 | 00 | 20 | 31 | 60 |

| C/A | TNO | PT | MI | SE | FR | ZE | PM | PS | PF |
|---|---|---|---|---|---|---|---|---|---|
| 01 | 00 | 01 | 97 | 36 | 00 | 00 | 11 | 16 | 37 |
| 01 | 00 | 01 | 97 | 36 | 01 | 00 | 11 | 16 | 37 |
| 01 | 00 | 01 | 97 | 36 | 02 | 00 | 11 | 16 | 37 |
| 01 | 00 | A0 | 97 | 36 | 03 | 00 | 01 | 00 | 00 |
| 01 | 00 | A0 | 97 | 36 | 04 | 00 | 01 | 00 | 00 |
| 01 | 00 | A0 | 97 | 36 | 05 | 00 | 01 | 00 | 00 |
| 01 | 00 | A1 | 97 | 36 | 06 | 00 | 01 | 00 | 00 |
| 01 | 00 | A1 | 97 | 36 | 07 | 00 | 01 | 00 | 00 |
| 01 | 00 | A1 | 97 | 36 | 08 | 00 | 01 | 00 | 00 |
| 01 | 00 | A2 | 97 | 36 | 09 | 00 | 74 | 00 | 00 |
| 01 | 00 | A2 | 97 | 36 | 10 | 00 | 74 | 00 | 00 |
| 01 | 00 | A2 | 97 | 36 | 11 | 00 | 74 | 00 | 00 |
| 01 | 00 | 01 | 97 | 36 | 12 | 00 | 00 | 06 | 37 |
| 01 | 00 | 01 | 97 | 36 | 13 | 00 | 00 | 06 | 37 |
| 01 | 00 | 01 | 97 | 36 | 14 | 00 | 00 | 06 | 37 |
| 01 | 00 | A0 | 97 | 36 | 15 | 00 | 01 | 00 | 00 |
| 01 | 00 | A0 | 97 | 36 | 16 | 00 | 01 | 00 | 00 |
| 01 | 00 | A0 | 97 | 36 | 17 | 00 | 01 | 00 | 00 |
| 01 | 00 | A1 | 97 | 36 | 18 | 00 | 01 | 00 | 00 |
| 01 | 00 | A1 | 97 | 36 | 19 | 00 | 01 | 00 | 00 |
| 01 | 00 | A1 | 97 | 36 | 20 | 00 | 01 | 00 | 00 |
| 01 | 00 | A2 | 97 | 36 | 21 | 00 | 74 | 00 | 00 |
| 01 | 00 | A2 | 97 | 36 | 22 | 00 | 74 | 00 | 00 |
| 01 | 00 | A2 | 97 | 36 | 23 | 00 | 74 | 00 | 00 |

(a)

| C/A | PT | AM | AS | AF |
|-----|----|----|----|----|
| 01 | 01 | 00 | 02 | 00 |
| 01 | 01 | 00 | 02 | 00 |
| 01 | 01 | 00 | 02 | 00 |
| 01 | A0 | 01 | 00 | 00 |
| 01 | A0 | 01 | 00 | 00 |
| 01 | A0 | 01 | 00 | 00 |
| 01 | A1 | 01 | 00 | 00 |
| 01 | A1 | 01 | 00 | 00 |
| 01 | A1 | 01 | 00 | 00 |
| 01 | A2 | 00 | 04 | 00 |
| 01 | A2 | 00 | 04 | 00 |
| 01 | A2 | 00 | 04 | 00 |

(a) 
(b)

| C/A | PT | AM | AS | AF |
|---|---|---|---|---|
| 41 | 01 | 00 | 01 | 00 |
| 41 | 01 | 00 | 01 | 00 |
| 41 | 01 | 00 | 01 | 00 |
| 41 | 02 | 01 | 02 | 00 |
| 41 | 02 | 01 | 02 | 00 |
| 41 | 02 | 01 | 02 | 00 |
| 41 | 03 | 02 | 02 | 00 |
| 41 | 03 | 02 | 02 | 00 |
| 41 | 03 | 02 | 02 | 00 |
| 41 | A0 | 01 | 00 | 00 |
| 41 | A0 | 01 | 00 | 00 |
| 41 | A0 | 01 | 00 | 00 |
| 41 | A1 | 03 | 00 | 00 |
| 41 | A1 | 03 | 00 | 00 |
| 41 | A1 | 03 | 00 | 00 |
| 41 | A2 | 09 | 00 | 00 |
| 41 | A2 | 09 | 00 | 00 |
| 41 | A2 | 09 | 00 | 00 |

FIG. 29

| C/A | PT | AM | AS | AF |
|---|---|---|---|---|
| 01 | 01 | 00 | 02 | 00 |
| 01 | 01 | 00 | 02 | 00 |
| 01 | 01 | 00 | 02 | 00 |
| 01 | 02 | 01 | 02 | 00 |
| 01 | 02 | 01 | 02 | 00 |
| 01 | 02 | 01 | 02 | 00 |
| 01 | 03 | 02 | 02 | 00 |
| 01 | 03 | 02 | 02 | 00 |
| 01 | 03 | 02 | 02 | 00 |
| 01 | A0 | 01 | 00 | 00 |
| 01 | A0 | 01 | 00 | 00 |
| 01 | A0 | 01 | 00 | 00 |
| 01 | A1 | 03 | 00 | 00 |
| 01 | A1 | 03 | 00 | 00 |
| 01 | A1 | 03 | 00 | 00 |
| 01 | A2 | 09 | 00 | 00 |
| 01 | A2 | 09 | 00 | 00 |
| 01 | A2 | 09 | 00 | 00 |

COPY-PROTECTED COMPACT DISC AND METHOD FOR PRODUCING SAME

RELATED APPLICATIONS

This application is a continuation in part application of U.S. application Ser. No. 10/310,987 filed Dec. 6, 2002, entitled "A Copy-Protected Compact Disc and Method for Producing Same", which is hereby incorporated by reference herein in its entirety.

FIELD OF THE INVENTION

The present invention relates to copy protection, and, more particularly, to a method and system for the copy protection of audio compact discs (CDs).

BACKGROUND OF THE INVENTION

Both computer software and digital audio recordings are commonly recorded on to compact discs (CDs). Computers, such as personal computers (PCs) read audio CDs differently than do consumer CD playback systems, such as car players, boom boxes, portable devices and hifi players, for example).

CDs are almost universally made in accordance with the following international standards:

International Standards Organization (ISO) 9660: Information Processing—Volume and File Structure of CD-ROM for Information Interchange, ISO Standard 13490-1

International Electrotechnique Commission (CEI-IEC) 908 (generally conforming to what is known as the "Red Book")

ISO/IEC 10140 (generally conforming to what is known as the "Yellow Book")

Because the data recorded on compact disc is in a digital format with an error-correction capability, it is possible to make faithful copies whose playback is indistinguishable from that of the original disc from which the copy was made. Furthermore, equipment for producing compact discs is readily available and relatively inexpensive, both for stamped discs and for recorded discs. As a result, the unauthorized or illegal copying of compact discs has thus become a serious problem.

Consumers who have purchased inexpensive computer systems and CD recorders are capable of making copies of original CDs, thereby depriving the copyright owner of a sale.

Only suitable copy-protection methods can succeed in reducing the increasing flood of these unauthorized recorded disc copies. Unfortunately existing prior art copy-protection methods are unsuitable and/or inadequately effective for the audio compact disc.

SUMMARY OF THE INVENTION

The present application relates to a copy-protected compact disc and a method for producing the optical disc and preventing unauthorized copying. The system and method of copy protection also protects CD-R discs and prevents their being extracted on to a personal computer (PC).

There is thus provided, in accordance with an embodiment of the present invention, an optical disc having at least one session, which includes a lead-in having a plurality of subcoding blocks. Each of the plurality of subcoding blocks includes an item, which may include at least a Point (PT), Adr/Ctrl, Pmin, Psec and Pframe. The Point of at least one of the plurality of subcoding blocks is identical to the Point in at least one other of the plurality of subcoding block and the value of at least one of a group including Adr/Ctrl, Pmin, Psec and Pframe in at least one of the plurality of subcoding blocks may differ from the value of at least one of the corresponding group of Adr/Ctrl, Pmin, Psec and Pframe in at least one other of the plurality of subcoding blocks.

In addition, in accordance with an embodiment of the present invention, the plurality of subcoding blocks may include a repetition of items, wherein at least one of the group including Adr/Ctrl, Pmin, Psec and Pframe of at least one of the repetition of items may be altered.

Furthermore, in accordance with an embodiment of the present invention, at least one of the values in the control data of the one of the repetition of items may be replaced by a misleading or invalid value. The misleading or invalid value may include an indication that an audio portion of the disc contains data or vice versa.

Furthermore, in accordance with an embodiment of the present invention, at least one of the values of the Cyclic Redundancy Check (CRC) of the one of the repetition of Items may be replaced by a misleading or invalid value.

In addition, in accordance with an embodiment of the present invention, at least one of the pluralities of subcoding blocks may include a continuous repetition of table of contents (TOCs). At least one item in at least one of the group including Adr/Ctrl, Pmin, Psec and Pframe of one of the repetition of table of contents (TOCs) may have a different value from the corresponding item in at least one other of the repetition of table of contents (TOCs). One of the repetitons of the table of contents (TOCs) may include a misleading or invalid triplet. The misleading or invalid triplet may include an indication that an audio portion of the disc contains data or vice versa.

Furthermore, in accordance with an embodiment of the present invention, the misleading or invalid triplet may include a misleading or invalid point Alternatively, the misleading or invalid triplet may include setting the Adr/Ctrl field to an invalid value.

Furthermore, in accordance with an embodiment of the present invention, one of the repetitions of the table of contents (TOCS) may include an interleaved pattern of alternating valid and invalid triplets. The alternating valid and invalid triplets may be represented by audio and data item respectively, or vice versa. Alternatively, the pattern may be randomized. Each track may be represented by at least one audio and one data item.

Furthermore, in accordance with an embodiment of the present invention, the one of the points of the one of the repetition of table of contents (TOCs) may remain uniform.

Furthermore, in accordance with an embodiment of the present invention, the one of the repetition of table of contents (TOCs) may include one of a group including at least one misleading or invalid triplet.

Furthermore, in accordance with an embodiment of the present invention, the plurality of subcoding blocks may include a combination of a repetition of items, and continuous repetition of table of contents (TOCs). One of the group including Adr/Ctrl, Pmin, Psec and Pframe of at least one of the repetition of items may be altered and at least one item in at least one of the group including Adr/Ctrl, Pmin, Psec and Pframe of one of the repetition of table of contents (TOCs) may have a different value from the corresponding item in at least one other of the repetition of table of contents (TOCs).

In addition, in accordance with an embodiment of the present invention, the plurality of subcoding blocks may include a plurality of zones, wherein an alteration algorithm may be applied to each of the plurality of zones. The plurality of zones may include any combination of a group including a valid table of contents (TOCs), an invalid table of contents (TOCs), an interleaved pattern of alternating valid and invalid entries and one of a group including at least one data track or at least one invalid triplet. The invalid table of contents (TOCs) may include one repetition of the table of contents (TOCs), which may be different from at least one other of repetition of the table of contents (TOCs).

Furthermore, in accordance with an embodiment of the present invention, the A0, A1, and A2 points may have invalid or misleading values.

In addition, in accordance with an embodiment of the present invention, the optical disc may include a multisession disc having a plurality of multisession pointers, wherein at least one of the pluralities of multisession pointers may be invalid or misleading. Alternatively, the optical disc may include a multisession disc having a plurality of multisession pointers, wherein at least one of the pluralities of multisession pointers may be invalid or misleading.

Furthermore, in accordance with an embodiment of the present invention, the optical disc may include one of a group including a compact disc (CD) a recordable compact disc (CD-R) and a CD-Rewritable compact disc (CD-RW).

Additionally, there is also provided, in accordance with an embodiment of the present invention, a method for protecting an optical disc from unauthorized copying. The method includes the steps of:

generating a lead-in, the lead-in having a plurality of subcoding blocks, each of the plurality of subcoding blocks, includes an item having at least a Point (PT), Adr/Ctrl, Pmin, Psec and Pframe, and altering the value of at least one of a group including Adr/Ctrl, Pmin, Psec and Pframe in at least one of the plurality of subcoding blocks to a value different from at least one of the corresponding group of Adr/Ctrl, Pmin, Psec and Pframe in at least one other of the plurality of subcoding blocks.

Additionally, in accordance with an embodiment of the present invention, there is provided, a method for generating a valid lead-in containing continuous repetition of table of contents (TOCs). The method includes the steps of:

reading the Program Area subcoding blocks pointed to by the continuous repetition of table of contents (TOCs); and discarding invalid or misleading triplets, so determined by the reading of Program Area.

Additionally, there is also provided a further method for generating a valid lead-in containing continuous repetition of table of contents (TOCs). The method includes the steps of:

reading the entire Program Area;

reading the channel Q of a frame being analyzed;

comparing the track number (TNO) of the analyzed frame with the track number (TNO) of the previous frame;

if the track number (TNO) of the analyzed frame may be greater than the track number (TNO) of the previous frame, creating a TOC entry with the new frame number and the ATime of the analyzed frame.

Additionally, in accordance with an embodiment of the present invention, there is provided, a method for determining the location of the table of contents (TOCs) being read by an optical disc player. The method includes the steps of:

reading the TOCs a plurality of times; and determining the average, minimum, and maximum LBA addresses of the TOCs being read.

Furthermore, in accordance with an embodiment of the present invention, there is provided, a method for protecting an optical disc from unauthorized copying. The method includes the step of altering the value of at least one of a group of fields of at least one of the lead-out pointer items, the group of fields including PM, PS, and PF fields.

Additionally, in accordance with an embodiment of the present invention, there is provided, an optical disc having an extra track whose location may be past the lead-out.

Additionally, in accordance with an embodiment of the present invention, there is provided, an optical disc having a plurality of subcoding blocks which have a continuous repetition of table of contents (TOCs), wherein each of the table of contents (TOCs) may be different from at least one of the other continuous repetition of table of contents (TOCs).

Furthermore, in accordance with an embodiment of the present invention, the plurality of subcoding blocks comprise a continuous repetition of table of contents (TOCs), and the PM, PS, and PF fields of at least one of the three lead out pointer items of at least one of the continuous repetition of TOCs may be different from at least one of other three lead-out pointer items.

The PM, PS, and PF fields may be equal to the MI, SE, and FR fields of one of the lead-out pointer items. The PMin field may be encoded with the minute and frame of the lead-in frame. Pmin may equal (frame/3)+((min−97)*25).

Furthermore, in accordance with an embodiment of the present invention, the program area may comprise a multitude of zones, each of the multitude of zones having a pre-determined time period. The pre-determined time period may be encoded as a series of modulated tones.

Additionally, in accordance with an embodiment of the present invention, there is provided, a method for protecting an optical disc from unauthorized copying. The method includes the steps of:

reading a calibration disc to determine the location of the table of contents (TOCs) being read by a specific player; and altering at least one of the repetitions of the located table of contents (TOCs), whereby one of the repetitions of table of contents (TOCs) has a different value from the corresponding item in at least one other of the repetition of table of contents (TOCs).

Additionally, in accordance with an embodiment of the present invention, there is provided, a method for determining location of the table of contents (TOCs) being read by specific CD players. The method includes the steps of:

reading the initial second of a calibration disc to determine the location of the table of contents (TOCs) being read by the specific players; aid assigning an address range to each of the specific players.

The step of reading may comprise the steps of:

reading the table of contents (TOCs) a plurality of times; and determining the average, minimum, and maximum LBA addresses of the TOCs being read.

BRIEF DESCRIPTION OF THE DRAWINGS

The invention is herein described, by way of example only, with reference to the accompanying drawings, wherein:

FIG. 2 is a schematic prior art representation of portions of two consecutive uniform TOCs in a given session of the CD of FIG. 1;

FIG. 3 is a prior art schematic representation of standard track pointers of the CD of FIG. 1;

FIG. 4 is a schematic prior art representation of multi-session pointers of the CD of FIG. 1;

FIG. 5 is a schematic prior art representation of a uniform TOC containing uniform triplets of the CD of FIG. 1;

FIG. 6 is a schematic illustration of a system for the copy protection of audio compact discs (CDs), according to an embodiment of the present invention;

FIG. 7 is a schematic illustration of a system for the copy protection of audio compact discs (CDs), according to a further embodiment of the present invention;

FIG. 8 is a schematic illustration of a system for the copy protection of audio compact discs (CDs), according to a further embodiment of the present invention;

FIG. 9 is a schematic illustration of a system for the copy protection of audio compact discs (CDs), according to a further embodiment of the present invention;

FIG. 10 is a schematic illustration of a system for the copy protection of audio compact discs (CDs),according to a further embodiment of the present invention;

FIG. 17 is a schematic illustration of a system for the copy protection of audio compact discs (CDs), according to an embodiment of the present invention;

FIG. 18 is a schematic illustration of a system for the copy protection of audio compact discs (CDs), according to a further embodiment of the present invention;

FIG. 19 is a schematic illustration of a system for the copy protection of audio compact discs (CDs), according to a further embodiment of the present invention;

FIG. 23 is a schematic illustration of a calibration disc for use in the copy protection of audio compact discs (CDs), according to an embodiment of the present invention;

FIG. 24 is a schematic illustration of a calibration disc useful in the copy protection of audio compact discs (CDs), according to a further embodiment of the present invention;

FIG. 27 is a schematic illustration of the architecture useful in the copy protection of audio compact discs (CDs), according to an embodiment of the present invention;

FIGS. 28, 29 and 30 are schematic illustrations of TOCs in each of zones 0, 1 and 2 in the copy protection of a CDR disc, according to an embodiment of the present invention;

GLOSSARY

Figures 1A, 1B, 1C, 1D, 1E:
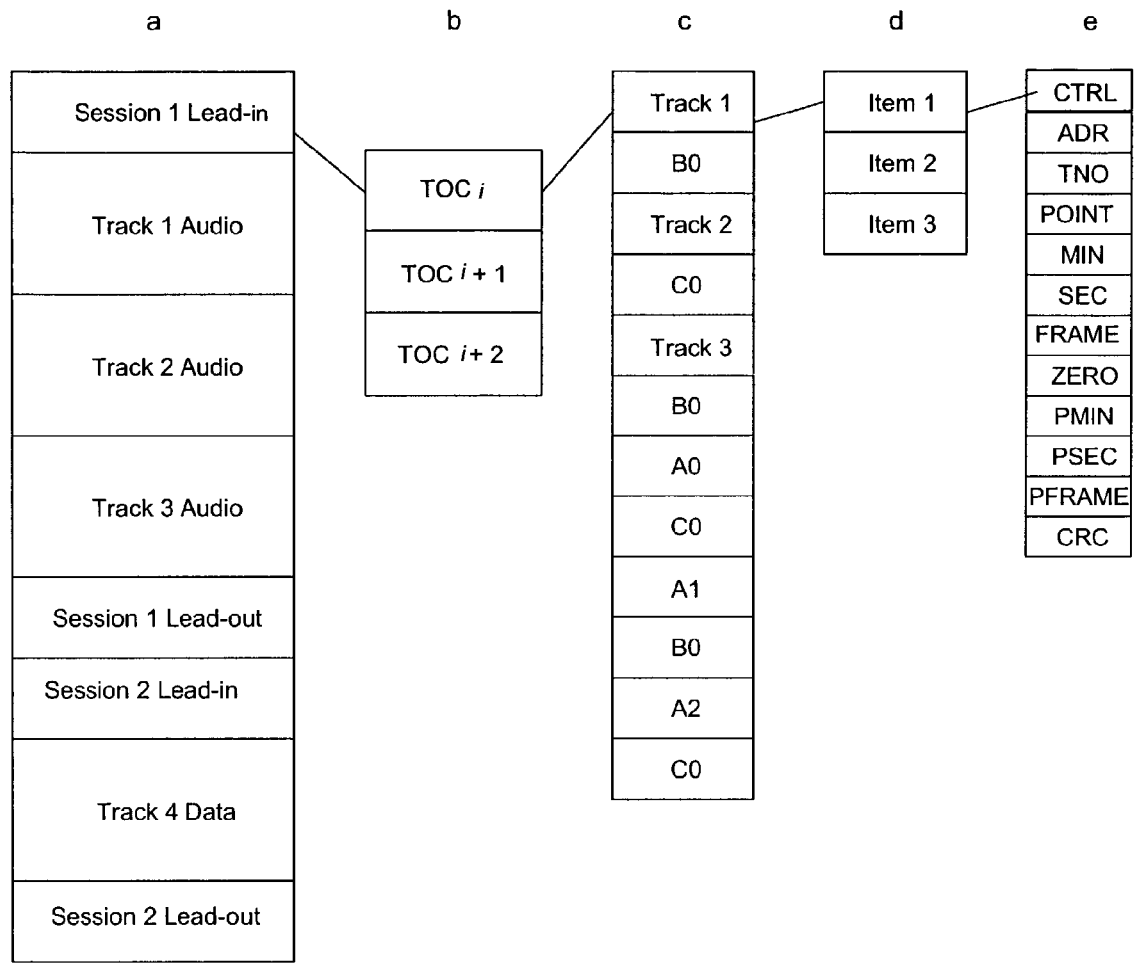
FIGS. 1a–1e are a schematic prior art representation of the structure of a compact disc (CD)

The following glossary of terms and acronyms are used in the present patent application.

| Term | Description |
| --- | --- |
| ATIP | Absolute Time in Pre-groove. This is an additional track pre-mastered into CD-R and CD-RW discs, allowing for precise positioning of the writing laser in a CD-R writer. The ATIP contains positioning information and some disc parameters required to write a CD-R. |
| BCD | Binary Coded Decimal. All integer fields in the Channel Q are encoded in BCD, while the CRC and bit fields (ADR/CTRL) are encoded in standard binary. |
| CD | Compact Disc including silver, CD-R, and CD-RW discs. |
| Channel Q | Bits $d_2$ of a subcoding block, arrayed as a single 12-byte structure, delimited by S0 and S1 subcoding sync patterns. |
| CRC | Cyclic Redundancy Check. Field in channel Q that checks validity of channel Q data. |
| Identical Items | Items that have the same values in the fields: CTRL, ADR, POINT, PMIN, PSEC, and PFRAME. |
| Identical Triplets | Two triplets that have the same values in the fields: CTRL, ADR, POINT, PMIN, PSEC, and PFRAME. |
| Invalid Item | An item that cannot be interpreted correctly under the rules of IEC 908. For example, an item that has an ADR value that is not 1, 2, or 5, or an item that has an invalid CRC. |

-continued

| Term | Description |
|---|---|
| Item | Channel Q of a subcoding block. |
| LBA | Logical Block Address. LBA is an addressing mode for CDs. LBA 0 is equal to MSF 00:02:00. Negative LBA addresses refer to the area before the beginning of the program area, such as the lead-in. |
| Lead-in | Track 0 of a session, contains TOCs in channel Q. |
| Lead-in Start Time | In CD-R and CD-RW media, the start time of the lead-in is a MSF value encoded into the ATIP in specific areas of the disc preceding and concurrent with the lead-in. |
| Lead-out | Control portion of a session that follows a session's tracks. |
| MSF | Minute:Second:Frame. This is an addressing mode for CDs. Typically encoded in BCD, values between 00:00:00 and 89:59:74 refer to positive offsets in the Program Area or lead-out, while 90:00:00 to 99:59:74 refer to the lead-in. |
| Misleading Item | An item that can be interpreted correctly, but does not match the track number, index, or control values in channel Q in the Program Area pointed to in its ATIME fields. |
| PCA and PMA | The Power Calibration Area and Program Memory Area are areas in CD-Rs, located before the Lead-in. |
| Player | A CD reading device, such as a CD-ROM drive, home entertainment device, portable CD player, or CD-R writer. |
| Polymorphic | Not uniform. A polymorphic triplet contains at least one invalid or misleading item. A polymorphic lead-in is defined as a lead-in having a at least two non-identical TOCs or at least one triplet in one TOC that is not uniform |
| PTIME | Point Time. Absolute starting time of POINT. In an item, PTIME is encoded in the fields PMIN to PFRAME as defined in Table 1. |
| Session | Section of a CD containing either audio or data tracks, or a combination of the two. A standard session contains a lead-in, at least one track, and a lead-out. |
| TOC (Table of Contents) | A complete description of a session. TOCs are repeated to end of a session's lead-in. |
| Track | Single content unit (program item) on a CD. |
| Triplet | Three consecutive lead-in items following a POINT boundary. |
| Uniform Lead-in | Lead-in composed only of identical TOCs. |
| Uniform TOC | TOC composed only of identical triplets. |
| Uniform Triplet | Triplet composed of three identical items. |

DESCRIPTION OF EMBODIMENTS

The present application relates to a copy-protected compact disc and a method for producing the disc and preventing unauthorized copying. The present invention provides an improved method that changes the contents of any lead-in item in any optical disc so that it is no longer uniform, as described in embodiments of the present invention, hereinbelow, so that the copied disc becomes effectively corrupted and unplayable.

Reference is now made to FIGS. 1a–1e which schematically represent the structure of a compact disc (CD) having uniform lead-ins. The exemplary disc is shown, for purposes of clarity and simplicity only, as having two sessions: Session 1 with three audio tracks (tracks 1–3), followed by Session 2 containing a single data track (track 4).

FIG. 1b illustrates the structure of the lead-in for session 1, showing that the lead-in is composed of uniform Table of Contents (TOCs) consisting of A0,A1, A2 and track pointers, that are repeated throughout the length of the lead-in. The TOC for session 2 (not shown) is similar to session 1 but contains only a single data track.

FIG. 1c shows the triplets in each TOC, with the multi-session pointers (B0 and C0). FIG. 1d shows that each triplet is composed of three items. In a uniform lead-in, each item in a triplet is identical. FIG. 1e shows the fields in a lead-in item.

The inventors have realized that it is possible to protect CDs from unauthorized copying by making changes to the Session lead-in. One novelty of the copy protection method is that disc produced by the copy protection method applies these techniques to CD-R discs, thereby protecting them and preventing them from being extracted on a PC. Due to the raw write modes available in current home CD-R writing hardware and software, no special modifications are needed to implement the lead-in copy protection on CDR and CD-RW discs.

Each session in a CD has a lead-in, which contains repetitions of the Table of Contents (TOC).

If a session's lead-in contains invalid data, a PC may not be able to read it properly. However, consumer CD playback systems (such as car players, boom boxes, portable devices, and hifi players) can ignore certain types of invalid lead-in data. For example, certain alterations to the lead-in of a disc's Red Book session make it difficult for a PC CD-ROM drive to correctly interpret the session, and hence, the disc, but these alterations do not affect the ability of consumer playback systems to play the disc.

In addition, certain CD reading devices read different offsets of the lead-in to determine the TOC, allowing specific instances of the TOC to target specific players.

In the present application the term "polymorphic" is defined as non-uniform. A polymorphic triplet is defined as a triplet, which contains at least one invalid or misleading item. A polymorphic lead-in is defined as a lead-in having at least two non-identical TOCs or at least one triplet in one TOC that is not uniform.

Channel Q

According to IEC 908, a subcoding block consists of the subcoding symbols in 98 consecutive EFM frames, delimited by the S0 and S1 sync patterns. Channel Q is the second most significant bit in each subcoding symbol following the sync pattern. In the program area of a disc, channel Q generally contains timing information, such as absolute disc time or track time. In the lead-in, however, channel Q contains information about the layout of the disc.

Table 1 describes a single item (ITEM) in channel Q, using the fields defined for the lead-in. For convenience, field names are used to refer to the bit position, even though the names are only valid for ADR=1 or ADR=5.

TABLE 1

Single ITEM in lead-in channel Q (Mode 1)

| Field | Length |
|---|---|
| CTRL (Control) | 4 bits |
| ADR (Mode) | 4 bits |
| TNO (Track Number) | 8 bits |
| POINT | 8 bits |
| MIN | 8 bits |
| SEC | 8 bits |
| FRAME | 8 bits |
| ZERO | 8 bits |
| PMIN | 8 bits |
| PSEC | 8 bits |
| PFRAME | 8 bits |
| CRC | 16 bits |

Physical Layout of the CD-R Lead-in

The lead-in of a CD is the area between 46 mm and 50 mm of a CD, as defined in IEC 908. In recordable discs, the ATIP (Absolute Time in Pre-groove) is used to determine the actual physical location and length of the lead-in. For illustration purposes, CDs used in this description will use CD-R terminology and layout. In an embodiment of the invention, the time fields MIN, SEC, and FRAME are defined here as used in CD-Rs. Generally, premastered CDs do not typically use these fields.

Recordable media has a lead-in start time of between 97:15:00 and 97:59:74, as defined in the OSJ Disc Identification Method specification. This start time determines the size of the lead-in, which nonetheless ends at same fixed diameter of 50.2 mm+/−0.2 mm. In this description, the lead-in is treated as a linear entity, beginning at the clamping area and ending at the end of the lead-out is Thus the term "before" refers to a physical location at a lower diameter, and "after" means at a greater diameter.

Since the lead-in provides a radius of 2 mm in which the TOC is repeated continuously, a player need not read the entire lead-in to determine the TOC. CD-R writers, which must access portions of the disc before the lead-in such as the PCA (Power Calibration Area) and PMA (Program Memory Area), typically read the TOC from a location closer to the beginning of the lead-in. Consumer electronic devices, which need to play the disc from the beginning of Track 1 immediately after the disc is inserted into the player, typically read from a location in the lead-in closer to the end.

Addresses in the lead-in are negative, with address 00:00:00 referring to the beginning of the program area. Since MSF values greater than 90:00:00 translate into negative, LBA (Logical Block Address) addresses, this specification treats the MSF (Minute:Second:Frame) values and their corresponding negative LBA addresses as interchangeable. Thus, a lead-in typically begins at an address of −−11500 LBA. These addresses are pre-mastered into the ATIP and copied into Channel Q of the lead-in frames.

Uniform TOCs

FIG. 2 is a schematic representation of portions of two consecutive uniform TOCs in a given session, showing selected fields. In this figure, and those based on it, "AUDIO" and "DATA" are used instead of their corresponding values of 00XXb and 01XXb. For clarity this partial table omits the A0–A2 pointers and multi-session pointers.

A0–A2 Items

In addition to the track pointers, lead-ins contain A0–A2 items, which state the number of the first track in a disc (A0), the number of the last track (A1) and the starting time of the current session's lead-out (A2). These items follow the standard track pointers as shown in FIG. 3.

Multi-session Discs

In addition to the track pointers and A0–A2 pointers, a multi-session disc has a further set of pointers that allow navigation between sessions in a linked list. These pointers are called the multisession pointers. They are interleaved between the standard track pointers, referenced 60, as shown in FIG. 4 with the multi-session pointers bolded, referenced 62 and 64.

Lead-Ins

A uniform lead-in is composed of Table of Contents (TOCs), with a TOC being the minimum number of items needed to fully describe a session. A uniform TOC contains uniform triplets. A triplet is composed of three identical contiguous items that follow a POINT boundary. Two items are said to be identical if the values of the corresponding fields indicated by an are identical (see FIG. 5). A triplet is said to be uniform if all three of its items are identical.

In the present invention, a lead-in is altered so that it contains valid, misleading, and/or invalid items arranged in a polymorphic manner, meaning that at least two of the lead-in's TOCs are not identical or at least one triplet in one of the lead-in's TOCs is not uniform.

As described below, these properties make it possible to alter the lead-in is so as to render the disc useless to PCs without rendering the disc unreadable to a home or auto system.

One method of changing a lead-in is to alter items so that not all items in a triplet are uniform.

Reference is now made to FIG. 6, which illustrates a system for the copy protection of audio compact discs (CDs) according to an embodiment of the present invention. FIG. 6 illustrates the alteration of a portion of the leadin so that the triplet is not uniform.

In the example of FIG. 6, the second of three identical AUDIO items (marked as A1$b$ in FIG. 2) has been altered so as to indicate DATA instead of AUDIO (the triplet item is bolded and the alteration is marked by the letter "a"). In a further embodiment of the present invention, illustrated in FIG. 7, the third of three identical AUDIO items (marked as A1$c$ in FIG. 2) has been altered to show an invalid CRC item of 5 (instead of 45).

In a further embodiment of the present invention, polymorphic TOCs are created while preserving uniform triplets. It will be appreciated by persons knowledgeable in the art that there are many possible methods of creating non-uniform (polymorphic) TOCs. Non-limiting examples of copy protection using polymorphic TOCs include comparing a track number with an iteration number and amending the item accordingly, or comparing the PTIME fields with known boundary values and amending the item according to physical location within the lead-in.

Reference is now made to FIG. 8 which illustrates an embodiment of the invention in which a portion of the lead-in (AUDIO triplet (marked A1 in FIG. 2 and "a" in FIG. 8) is altered to a DATA triplet (marked "b" in FIG. 8).

FIG. 9, to which reference is now made, illustrates a further embodiment of the invention in which the point (PT) of a triplet is amended to 3 (marked by the letter "a") instead of the correct value of 2 (A5 in FIG. 2).

Reference is now made to FIG. 10, which illustrates a further embodiment of the invention in which polymorphic TOCs are created by setting the Mode (ADR) field of an item or an entire triplet to a value other than 1, 2, or 5. In the exemplary embodiment of FIG. 10, the ADR of a triplet (marked "a") is set to 8 instead of the correct value of 1.

Figure 11:
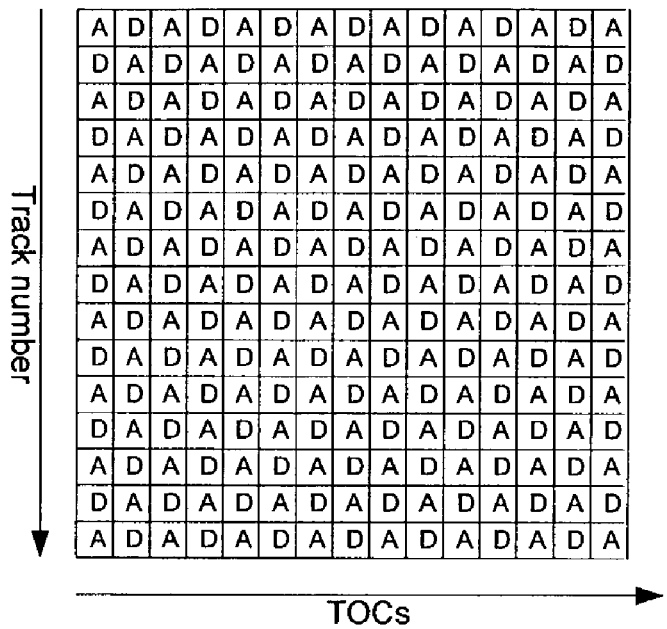
FIG. 11 is a schematic illustration of a system for the copy protection of audio compact discs (CDs), according to a further embodiment of the present invention.
Figure 12:
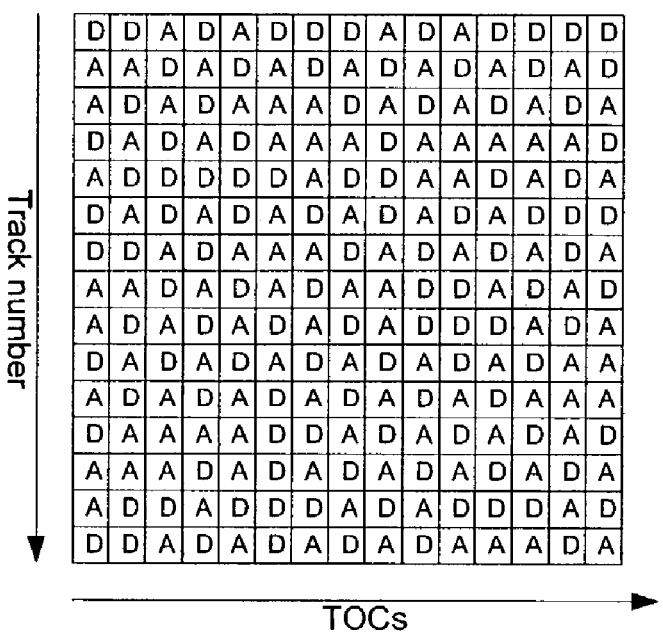
FIG. 12 is a schematic illustration of a system for the copy protection of audio compact discs (CDs), according to a further embodiment of the present invention.
Figure 13:
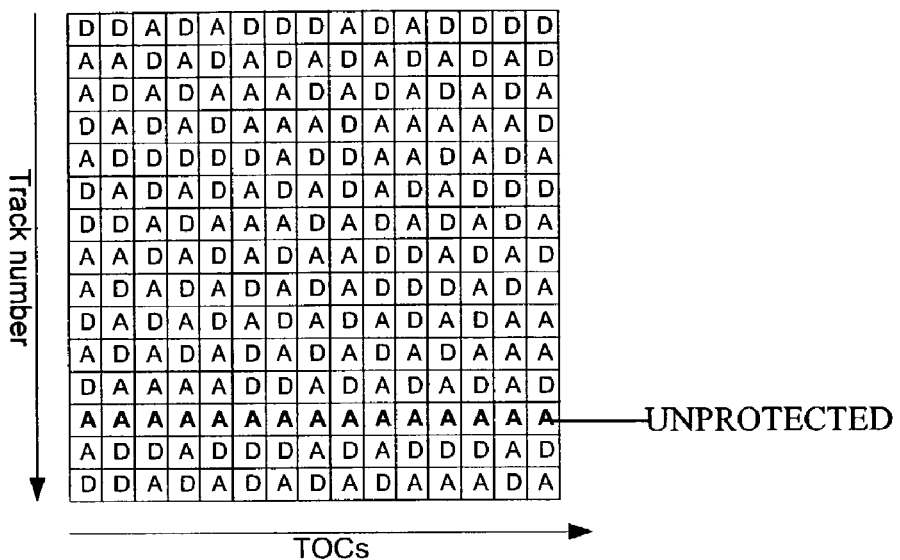
FIG. 13 is a schematic illustration of a system for the copy protection of audio compact discs (CDs), according to an embodiment of the present invention.

In a yet further example of an embodiment of the invention, creating a "checkerboard" pattern of misleading and valid items produces polymorphic TOCs. Reference is now made to FIGS. 11–13. FIG. 11 is an exemplary illustration of a "regular" checkerboard composed of alternating valid AUDIO and misleading DATA items.

In the example of FIG. 11, a disc with 15 audio tracks is protected by marking alternate tracks as DATA (setting the data bit in the ADR/Ctrl byte), instead of AUDIO thereby creating misleading items. It will be appreciated by persons knowledgeable in the art that any other technique of creating misleading items may be used in place of setting the data bit.

FIG. 12 is an exemplary illustration of a randomized checkerboard of polymorphic TOCs. In the example of FIG. 12, a "regular" checkerboard is first created (similar to FIG. 11) and then the checkerboard is randomized. Each track is represented by at least one A (AUDIO), and one D (DATA) item.

Reference is now made to FIG. 13, which illustrates a further embodiment of the invention using polymorphic TOCs, in which a partial checkerboard is created. In this case, a "regular" and/or a randomized checkerboard is created with the additional modification of containing at least one unprotected row (a row of AUDIO items shown bolded in FIG. 13).

Figure 14:
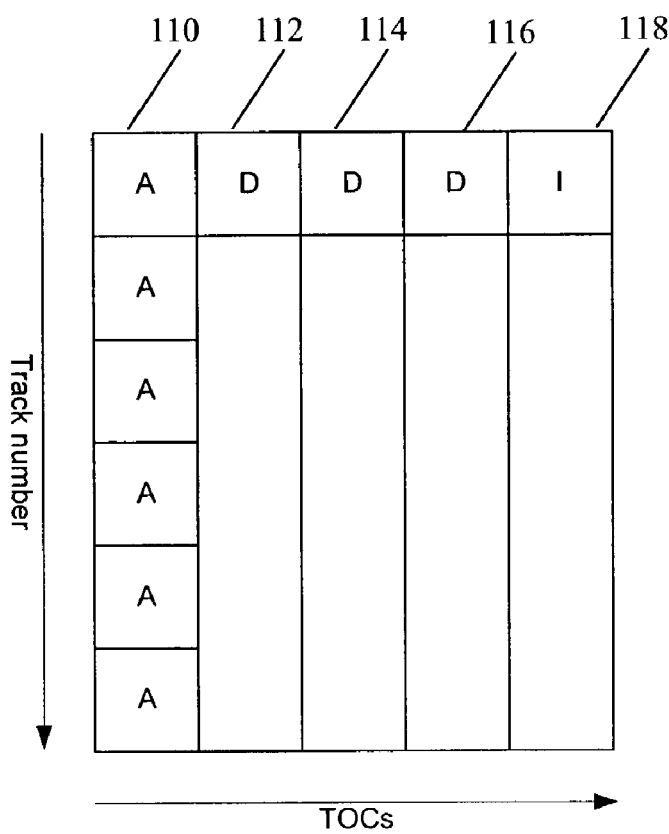
FIG. 14 is a schematic illustration of a system for the copy protection of audio compact discs (CDs), according to a further embodiment of the present invention.

Reference is now made to FIG. 14, which illustrates a further embodiment of the invention utilizing polymorphic TOCs. In the example of FIG. 14, a valid TOC is created at an offset of the lead-in (column 110). A number of misleading TOCs are added (columns 112, 114, 116) containing only one data track. Finally, the sequence is terminated with a single invalid triplet (column 118).

It will be appreciated by persons knowledgeable in the art that alteralons may be also be made to an individual triplet (as described hereinabove with reference to FIGS. 6 and 7 for example) in addition to alterations to a TOC, either individually or any combination with polymorphic triplets and TOCs.

Figures 15, 16:
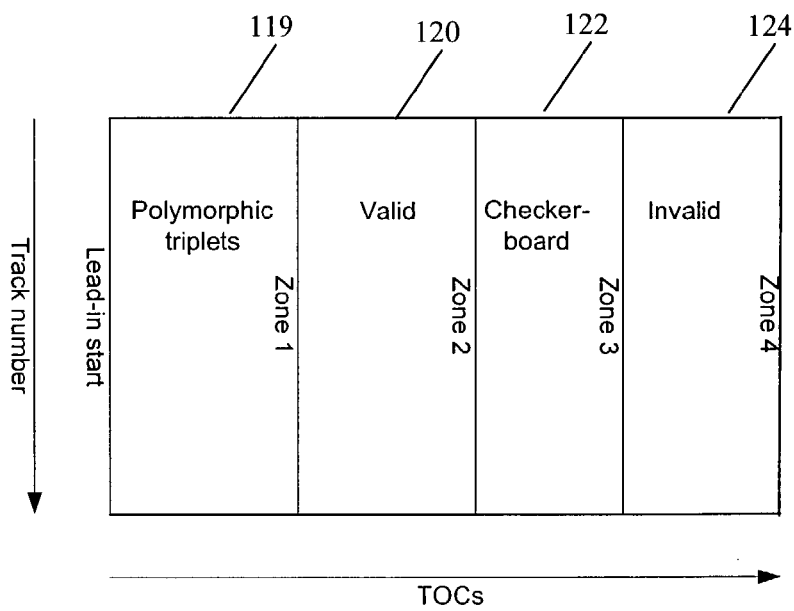
FIG. 15 is a schematic illustration of a system for the copy protection of to audio compact discs (CDs), according to a further embodiment of the present invention.
FIG. 16 is a schematic illustration of a system for the copy protection of audio compact discs (CDs), according to a further embodiment of the present invention.

Reference is now made to FIG. 15, which illustrates a further embodiment of the invention in which a lead-in is altered so as to comprise a combination of polymorphic triplets and polymorphic TOCs. The example of FIG. 15 illustrates a polymorphic triplet (marked by the letter "a") in which the AUDIO item ahs been amended to a DATA item and the polymorphic TOC (marked by the letter "b"), in which the AUDIO triplet has been amended to a DATA triplet.

Reference is now made to FIG. 16, which illustrates a further embodiment of the invention in which both polymorphic triplets and polymorphic TOCs are applied to the same lead-in (known as a "composite" disc). Such a lead-in contains zones, with a zone being a series of consecutive TOCs sharing a common alteration algorithm.

In the example of FIG. 16, the first zone 120 comprises triplets, which are all polymorphic. The second zone 122 comprises valid uniform TOCs, while the third zone comprises a checkerboard 123 (similar to the checkerboard embodiments described hereinabove with reference to FIGS. 12 and 13). In the fourth zone, all of the items are DATA as described hereinabove with reference to FIG. 14. As will be appreciated by persons knowledgeable in the art the examples are non-limiting and may be applied to any session of a "composite" disc.

Reference is now made to FIG. 17 which illustrates a further embodiment of the invention in which the A0–A2 items in polymorphic TOCs may be changed. The Control field (C/A) may be amended so that triplet 126 is non-uniform, that is part of the C/A of triplet 126 is amended to 41 h (instead of 01 h—see triplet 50 of FIG. 3).

In one embodiment, the A0–A2 items of a triplet 128 (marked "a") may be left unaltered, regardless of processing of triplet 126.

The example of FIG. 17 further illustrates two alternative ways of altering the A0–A2 items. In triplet 130 (marked "b"), the A0–A2 items may be invalidated (to "41") in the same ways as the surrounding track pointers of triplet 126. In triplet 132, the A0–A2 items may be invalidated in a way that is different from the surrounding track pointers so that part of the C/A is altered to give a misleading (and invalid) reading of "48".

As illustrated, modifications may occur in any of the three items of a triplet.

While this example demonstrates polymorphic triplets with A0–A2 items, it will be appreciated by persons knowledgeable in the art that A0–A2 items may also be applied to polymorphic TOCs.

Reference is now made to FIG. 18, which illustrates a further embodiment of the invention in which the multisession pointers of a Polymorphic TOC may be altered. As described hereinabove with reference to FIG. 4, a multisession disc has a set of multi-session pointers 62 that are interleaved between the standard track pointers 60 and allow navigation between sessions in a linked list.

In one embodiment, the multisession pointers 136 (marked "a") (equivalent to multisession pointers 62 in FIG. 4) may be left unaltered, regardless of processing of triplets 138, 140. The C/A values of two of the triplets 138, 140 have been altered to "41" instead of "01" in multisession pointers 60 of FIG. 4. Similarly, multi-session pointers 142 (equivalent to multisession pointers 64 in FIG. 4) are unaltered.

The example of FIG. 18 further illustrates two alternative ways of altering the multi-session pointers. In triplet 144 (marked "b"), the multisession pointers may be invalidated in the same ways as the surrounding track pointers of triplets 146, 148. In triplet 150, the multisession pointers be invalidated in a way that is different from the surrounding track pointers so that part of the C/A triplet is altered to give a misleading (and invalid) reading of "48". Modifications may occur in any of the three items in a triplet.

While this example demonstrates polymorphic multisession triplets, it will be appreciated by persons knowledgeable in the art that polymorphic TOCs may also be similarly amended.

Reference is now made to FIG. 19 which is an exemplary illustration of an embodiment of the present invention in which polymorphic TOCs include both a polymorphic TOC and multisession pointers that are all invalidated. In the example of FIG. 19, all alterations are italicized and the multisession pointers are bolded. The second audio track 152 has a misleading Ctrl in the second TOC shown (Ctrl=4, indicating DATA, rather than AUDIO) and all the B0 multisession pointers 154 have an invalid ADR (ADR=8).

Figure 20:
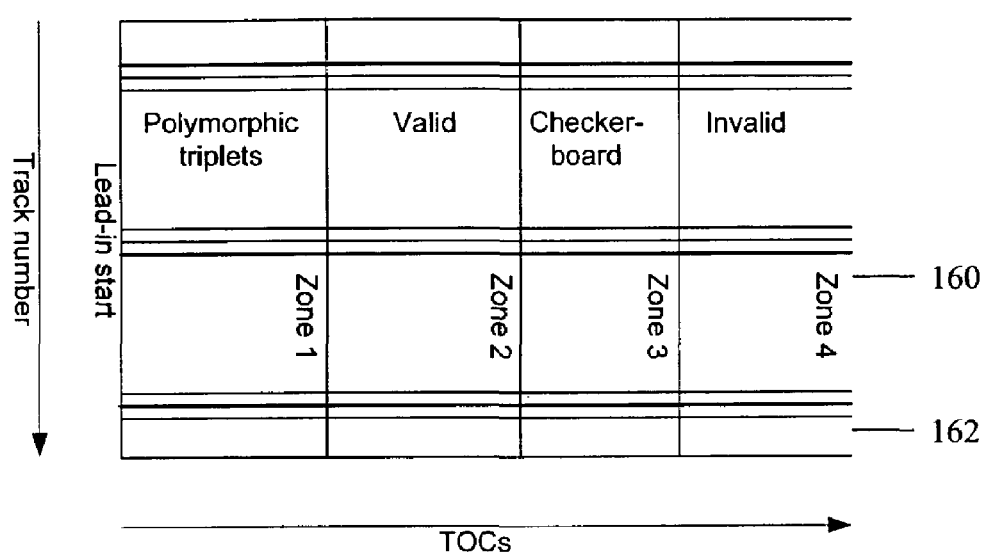
FIG. 20 is a schematic illustration of a system for the copy protection of audio compact discs (CDs), according to a further embodiment of be present invention.

This type of modification can be made to polymorphic TOCs that have polymorphic triplets in which the multi-session pointers all point to an incorrect location in the Program Area. Reference is now made to FIG. 20 which is an exemplary illustration of an embodiment of the present invention in which a composite disc, (described hereinabove with reference to FIG. 16), may also include multi-session pointers invalidated in a polymorphic manner. For example, in FIG. 20, the bold lines 160, 162 indicate the invalidated multisession pointers.

It will be appreciated that in a composite disc, different mull-session effects may be applied to each zone. Furthermore, certain zones may eliminate multi-session pointers altogether, effectively "hiding" the second session. In a disc with more than two sessions, a middle session may be hidden in certain device classes by restricting or modifying the multisession pointers or eliminating them on a zone-by-zone basis.

Optimal Zoning

Different classes of CD reading devices determine the TOC from a different position in the lead-in. This position varies from manufacturer to manufacturer and may be affected by the media type.

Figure 21:
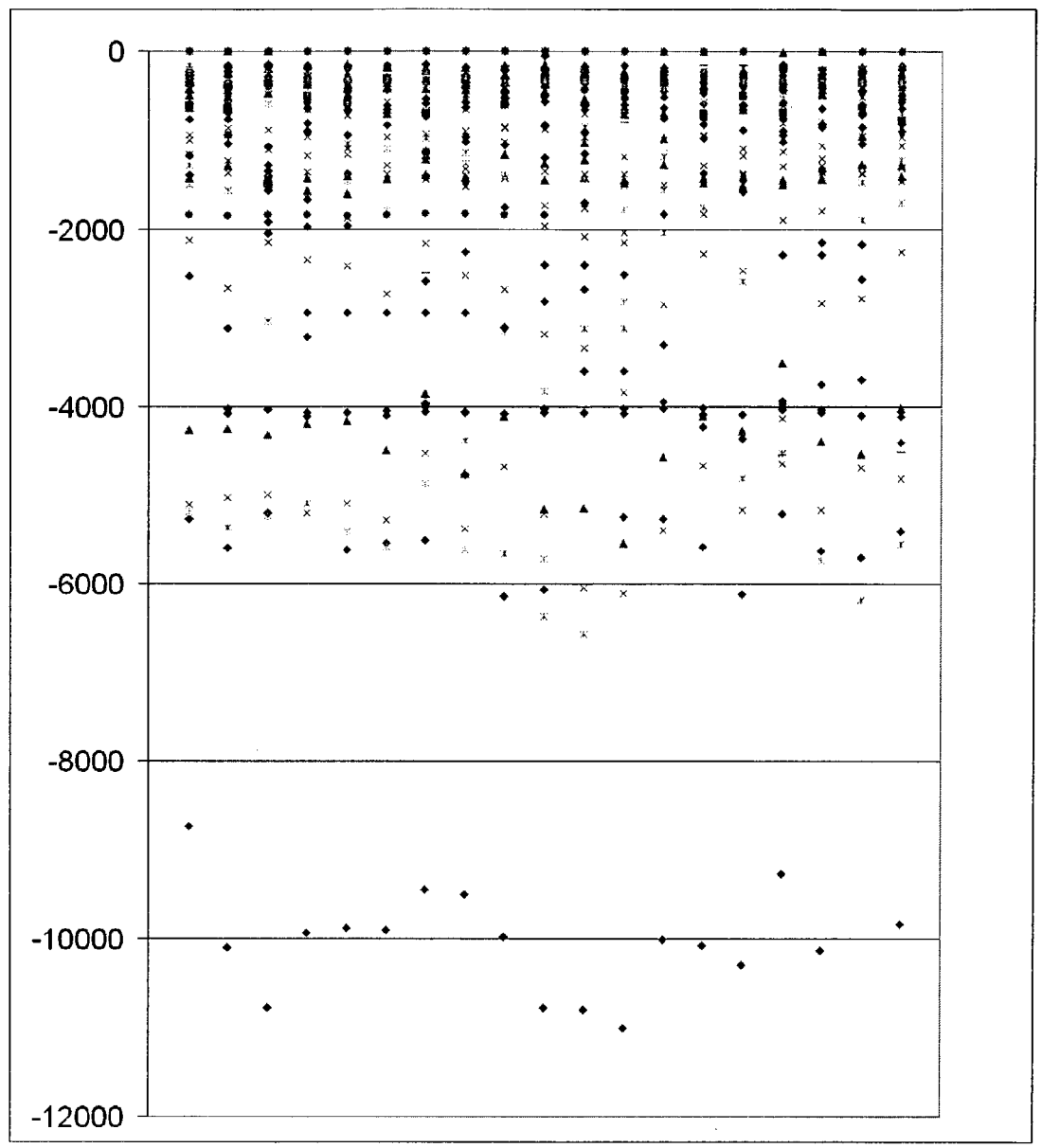
FIG. 21 is a graphical representation-illustrating sample TOC "reads" on common audio CD-R devices.

Reference is now made to FIG. 21, which is a graphical representation illustrating 190 sample TOC "reads" on common audio devices using 19 different CD-R media types. Diamond shapes represent DVD players and all other shapes represent common home entertainment devices. It can be appreciated from this graph that the vast majority of players determine the TOC from near the end of the lead-in, between locations 0 and −6000 LBA, of which the highest percentage are located between 0 and −2000 LBA.

Figure 22:
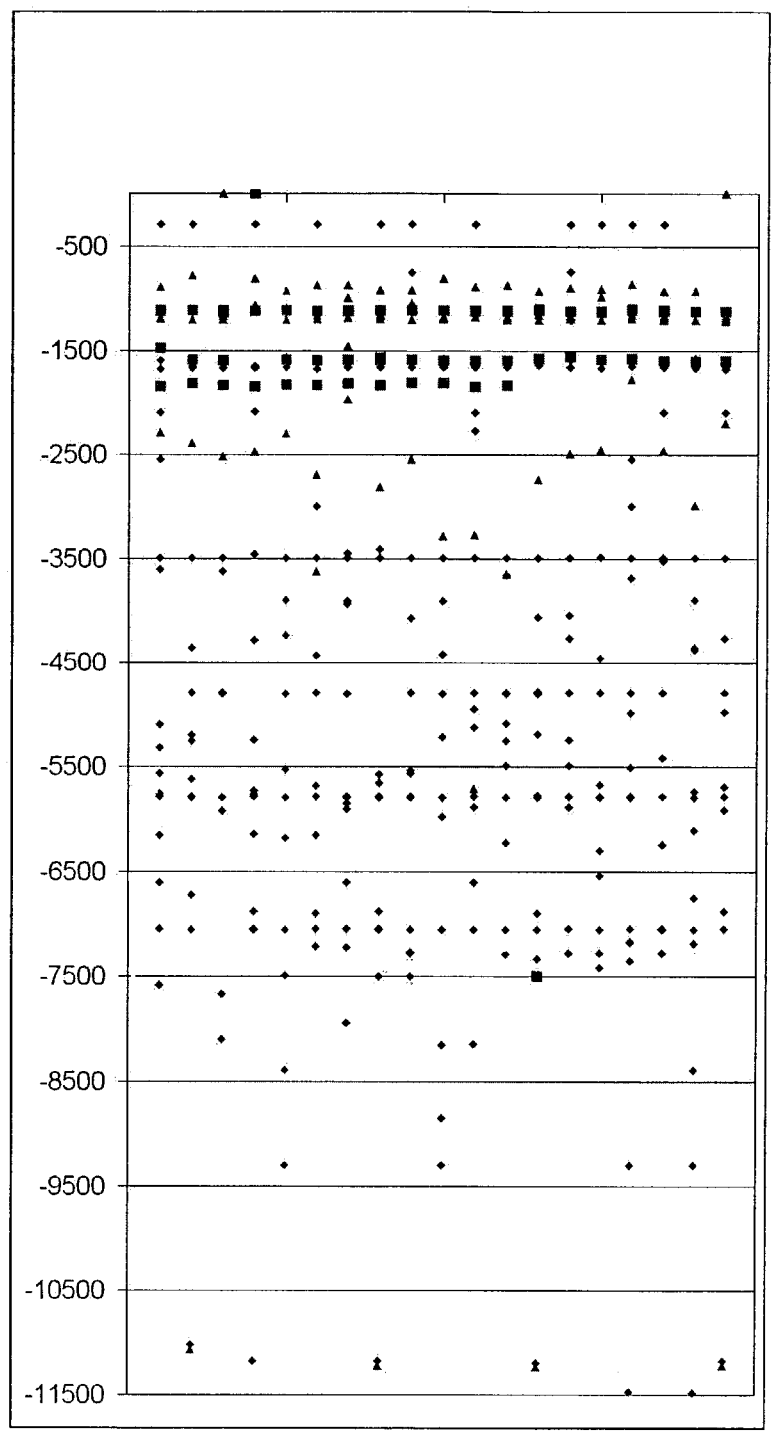
FIG. 22 is a graphical representation-illustrating sample TOC "reads" on CD-ROM, CD-R, and DVD-ROM players.

FIG. 22, to which reference is now made, illustrates 190 TOC reads on common PC CD-ROM, CD-R, and DVD-ROM players, using the same methodology as used in FIG. 21. Diamonds represent CD-R/CD-RW writers, squares represent CD-ROM readers, and triangles represent DVD-ROM readers. All discs used in the test were CD-Rs. Similar results are obtainable with CD-RWs.

As can be seen from these illustrations, devices can be divided into five classes, as follows:

Home entertainment devices and consumer players
DVD players
DVD-ROM drives
CD-ROM drives
CD-R writers Since each class of device statistically determines the TOC from a different area of the lead-in, different TOCs can be placed in diferent areas of the lead-in to target a specific class. It should be noted that DVD players sometimes use components of DVD-ROM drives by the same manufacturer, and that there is overlap between different classes of device.

In one embodiment of the invention, a disc may be created that will only play on a specific player by making a lead-in that has a correct TOC only at the offset that the player will read, and a misleading lead-in elsewhere. For example, a disc with secure information may have an extra track, whose presence is specified only at a lead-in offset that is not read by drives. Very few PC players today allow user-level processes to read the lead-in programmatically, and even those that can do so only do so in a very limited way.

Furthermore, existing players will generally not read past the lead-out. Thus, if an alternative layout of tracks specifies a track past the lead-out, and a player is designed to read the lead-in at a certain point and build a TOC from there, the track will only be visible on that player. These discs may be created using standard CDR writers but will only be readable on a special player, which has been designed to read the TOC at a specific offset.

Calibration Discs

To determine where a player will read the TOC, a calibration disc may be created. This disc may use a polymorphic TOC that is different for each iteration, allowing determination of which iteration was used to read the TOC. Since players do not generally read exactly the same location each time, a number of sample TOC reads should be obtained to determine the average, minimum, and maximum LBA addresses of the TOC being read.

It should be appreciated that the specifics of how a player determines the TOC may vary according to the different manufacturer's specifications and sometimes-similar players may determine the TOC differently. Calibration is only used to determine observed behavior and may not necessarily indicate a specific implementation by a manufacturer. However, it may be used with relative precision to determine how a group of similar players will behave. Calibration discs may include the following exemplary types:

a. Precise PTime
b. Minute/Second
c. Tone a. Precise PTime

In the Precise PTime implementation, illustrated in FIG. 23, to which reference is now made, the MI, SE, and FR fields of the first lead-out pointer item (A2) are copied into the PM, PS, and PF fields of all three lead-out pointer items of each TOC. (See Table 1, hereinabove) for the definitions of these fields.) The copied fields are bolded and marked with the lefter 'a'.

A disc with twenty tracks has a TOC that spans 69 frames, while a minimal TOC, as illustrated above, has only 12 frames in it. To properly determine calibration, discs with different track counts are used. This ads tailoring zone parameters for different disc sizes. For clarity, the exemplary FIG. 23 shows one track.

The calibration disc is useful for players that display frames. When a disc is inserted into a player, the player typically displays the lead-out pointer on its display. However, most consumer audio devices do not display frames. This causes the maximum resolution of calibration on this disc to be 75 frames, which is not fine enough for short TOCs, as might be found on CD singles. For example, a CD single has a TOC that consists of 12 frames (one triplet for Track 1, and three triplets for the A0–A2 pointers). Therefore, over 6 TOC repetitions fit into one second of lead-in. To determine which of the six TOCs is being used to determine disc layout, a finer granularity is needed.

b. Minute/Second

The minute/second calibration disc, which is schematically illustrated in FIG. 24, is usable on all player classes that display at least the minute and second of the lead-out pointer. In this calibration disc, the PMin field is encoded with both the minute and frame of the lead-in frame being used as a reference, using the following equation. For clarity, the calculations are illustrated in BCD (Binary Coded Decimal):

$$p\text{min} = (\text{frame}/3) + ((\text{min} - 97) * 25) \qquad \text{Eq. 1}$$

To reconstitute the original reading, the following equations are used:

$$\text{min} = (\text{int}(p\text{min}/3)) + 97 \quad \text{Eq. 2}$$

$$\text{frame} = (p\text{min} \bmod 25) * 3 \quad \text{Eq. 3}$$

c. Tone

The Tone disc may be used for automatic data acquisition. In an exemplary Tone calibration disc, the program area disc may be divided into 1125 zones, each three seconds long. In each three-second block, the iteration number may be encoded as a series of modulated tones using any standard modulation technique that is compatible with analog conversion. The modulation number is preferably repeated at a rate of at least three iterations per second.

The calculation is as follows:

The total number of possible zones based on a three-minute lead-in (actual lead-ins on CD-Rs are a bit shorter), and a minimum TOC size of 12 frames is 1125. Each zone is assigned a sequential number based on position, starting at 1125 and decrementing to 0.

To convert a MSF position in the TOC to its zone number, the following calculation may be used:

$$lba\text{pos} = (((\text{min}*60) + \text{sec})*75) + \text{frame} - 450000 \quad \text{Eq. 4}$$

$$(13500 + lba\text{pos})/12 = \text{iteration} \quad \text{Eq. 5}$$

To convert the zone number back to the LBA position, the following calculation may be used:

$$lba\text{pos} = (\text{iteration}*12) - 13500 \quad \text{Eq. 6}$$

The LBA position may be reconstituted into the MSF using the converse of the equations 46, above.

Track 1 of each iteration points 1 second and 37 frames into the zone.

Figures 25, 26:
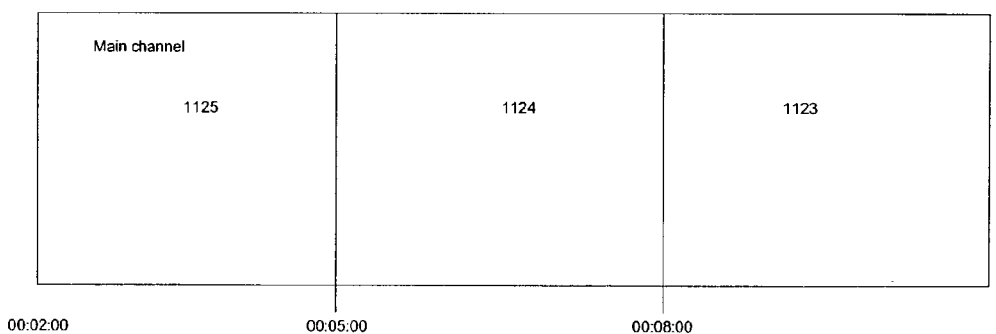
FIG. 25 is a schematic illustration of an implementation of the TOC, according to a further embodiment of the present invention.
FIG. 26 is a schematic illustration of encoding of the beginning of the program area, according to an embodiment of the present invention

Reference is now made to FIG. 25, which is an exemplary illustration of the implementation of the TOC.

The iteration number (address range) begins at iteration 225, for example, which corresponds to the MSF of 97:36:00: Iteration 225 is an arbtrary iteration number, based on the OSJ lead-in start time for Mitsui SG media which were used for this sample. It will be appreciated by persons knowledgeable in the art that any iteration number may be used.

The beginning of the program area is encoded as illustrated in FIG. 26.

To calibrate the player using this disc, the disc is played for a few seconds. The initial second of playback is captured into a computer and demodulated into binary data, which is then reconstituted into the iteration value.

This technique can be used with any number of tracks.

Contents of Each Zone

As can be seen in FIGS. 21 and 22, many CD-R writers determine the TOC by reading towards the beginning of the lead-in, at addresses of approximately −11500 to −3500 LBA (depending on parameters such as the type of disc, the ATIP lead-in start time in CD-R discs, multi-session parameters, and the length of each TOC), while most commercial CD and DVD players read towards the end of the lead-in (−2000 to 0 LBA).

In an embodiment of the invention, other CD copy protection methods, for example, those that target the Program Area may be combined with zoning. For example, architecture such as that described in FIG. 27, to which reference is now made, may be used to provide an optimum balance of effectiveness against copying and compatibility with existing CD and DVD players.

Figures 27, 28:
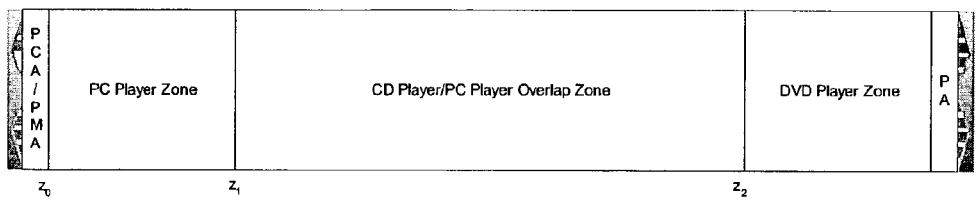

In FIG. 27, $z_0$ refers to the beginning of the TOC repetition in the lead-in, and $z_1$ and $z_2$ are the zone transitions that refer to the boundaries between the different player classes. In a nonlimiting example, $z_1$ is set to −8000 and $z_2$ is set to −1300. The TOCs in each of zones 0, 1 and 2 are as depicted in FIGS. 28, 29, and 30, respectively. The true layout of the disc is as illustrated in FIG. 30.

FIG. 30 illustrates a CD-R disc. It will be appreciated by persons knowledgeable in the art that a pre-recorded CD may be similarly used with the same techniques.

In this example, a Zone 0 CD reader will see a disc containing a single session, with a single audio track (FIG. 28). The audio track is two seconds long, making the disc effectively blank and closed. This provides very strong protection against copying in Zone 0 players, and thus Zone 0 must be carefully limited to eliminate any possibility of reducing playability on consumer playback devices.

Zone 1 (FIG. 29) marks all tracks as data tracks (C/A=41 [marked a]), but shows the true layout of the tracks. This provides limited effectiveness against copying, primarily by PC copying software that determines the read mode of the tracks based on the data flag in the TOC. Such software will initiate a read in 2048-byte mode instead of 2352-byte mode, and will either cause a read failure as the hardware will not match the read mode against the Program Area Channel Q control flags, or cause a corrupt read as 304 bytes of each frame will be corrupted.

This may be further complicated by scrambling, which is applied to data frames but not to audio frames. Scrambling is a technique that is used in data frames to reduce the possibility of problematic bit patterns. When the Q channel indicates that that track is a data track–even if the Q channel on the frame indicates an audio frame, it is possible that the software reader will attempt to descramble the audio data, which of course will totally corrupt the audio. This is generally the situation with raw software readers, since hardware descrambling is on a frame-by-frame basis. DVD players tend to read data CDs in Video CD format or MP3s and thus may not read the audio correctly.

In certain DVD players the data flag may prevent playback, necessitating the third zone (Zone 2). Most CD players are not affected. Other techniques such as changing Track 1 starting offset (AS) to less than two seconds may be applied here as well, as illustrated in FIG. 29 [(marked (b)].

Zone 2 (FIG. 30) is normally unprotected. This provides optimum playback by DVD players and CD players but does not provide any protection against any PCbased CD-ROM drive that reads in this zone. As can be seen in FIG. 21, few PC-based players read in that space.

Defining the zones correctly will provide a balance of effectiveness and playability. It will be appreciated that zone values need to be determined based on algorithmic values relating to the size of the TOC, the size of the lead-in, and the optimum balance between effectiveness and compatibility for each device type. Furthermore, effective zoning is only one component of a comprehensive solution providing CD-Audio disc protection.

Generating a PMT Disc

Figure 31:
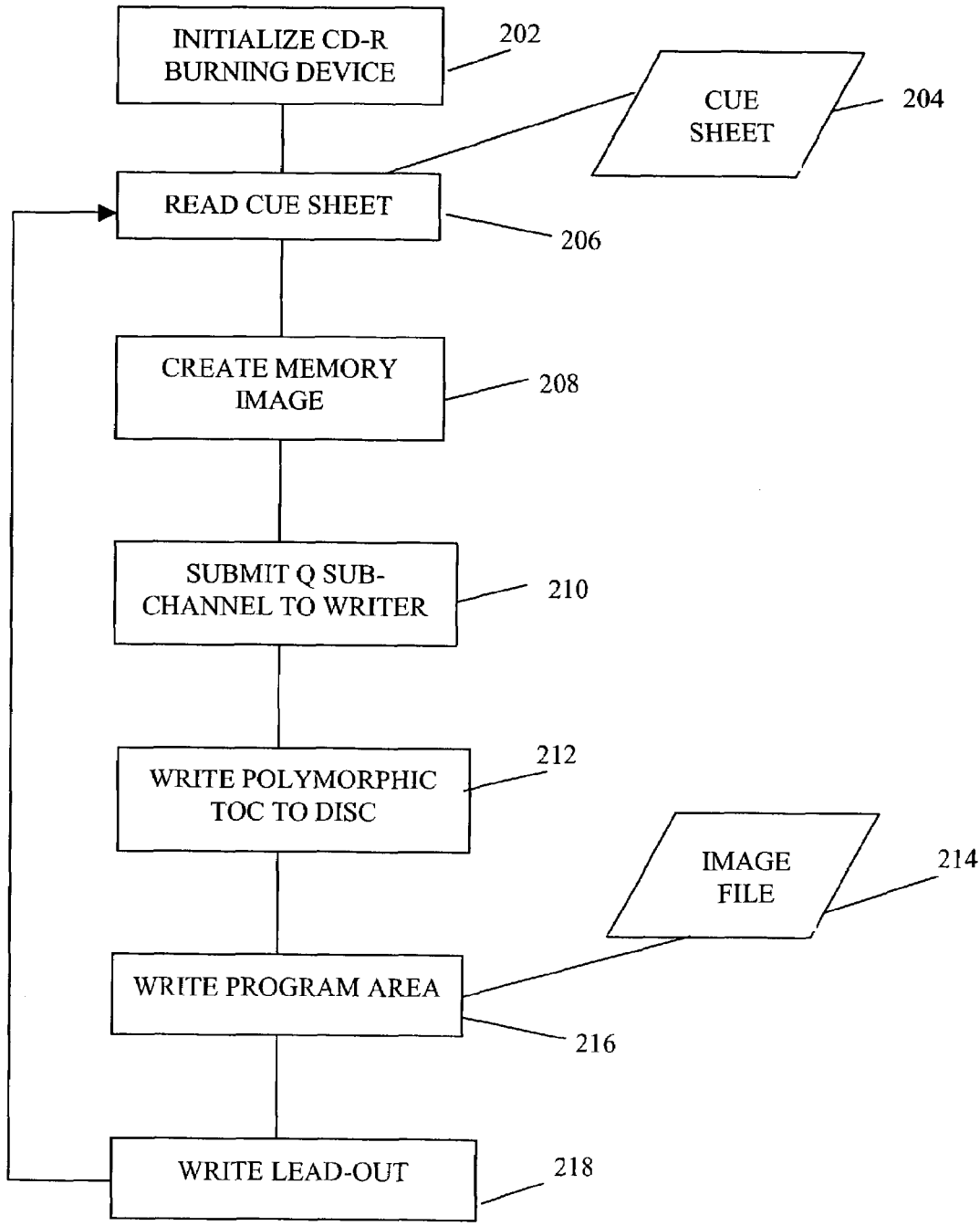
FIG. 31 is a flow-chart illustration of a method of generating a Polymorphic TOC disc, according to an embodiment of the present invention.

Reference is now made to FIG. 31, which is a flow-chart illustration of a method of generating a Polymorphic TOC disc.

The CD-R writer determines that a blank CD-R is in place in the drive and is initialized in Raw DAO mode (step 202). The cue sheet (204) is read (step 206) and a memory image of the lead-in to be produced is created (step 208). The cue sheet describes the layout of the disc in terms of tracks. At a minimum, the cue sheet may provide the absolute time offset in frames for each track and the total number of tracks.

The lead-in is formed in the Q channel of successive frames and submitted (step 210) in blocks of frames to the writer. For each frame, an algorithm that generates the form of polymorphism applicable to that frame may be applied. The correct Q channel is placed into the raw stream that is submitted to the writer (step 212).

After the lead-in is written, the Program Area is written (step 216) using the image file (214). The image file may be a 44.1K sample per second stereo (16 bits per sample) PCM file containing the main channel of the disc as a waveform, or a raw 2352-byte per sector ISO file for a data disc. The subchannel is calculated normally for each frame according to the algorithms in IEC 908. The lead-out is then written (step 218).

In a multi-session disc, steps 206–218 repeated for each session.

It may be useful to create a valid audio TOC, for example, for use in a first session. One method of creating a valid audio TOC may read the TOC sequentially, only the basic parameters from the TOC are determined. The basic parameters must be valid regardless of polymorphism, and thus a true TOC may be recreated by reading the Program Area entries pointed to by any valid triplets.

Figure 32:
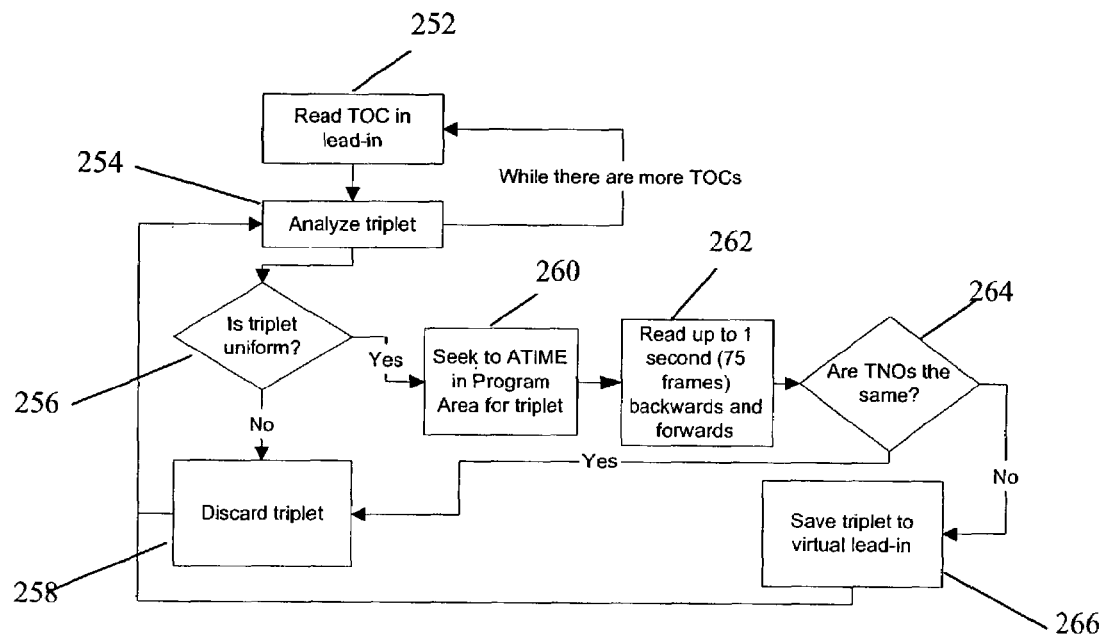
FIG. 32 is a flow-chart illustration of a technique for creating a true lead-in, according to an embodiment of the present invention.

FIG. 32, to which reference is now made, is a flow-chart illustration of a method for creating a true lead-in. The TOC is read (step 252) and for each triplet in the instance of the TOC, the triplet is analyzed (step 254). If the triplet is not uniform (query box 256), it is discarded (step 258).

If the triplet is uniform, the ATime pointed to by the triplet is sought and the Q channel at the Atime in the Program Area is read (step 260). An analysis (step 262) of the frames (both backwards and forwards of the Atime) is then made. For example, since one second of time is equivalent to 75 frames, by analyzing one second either side of the Atime, it should be possible to locate a frame with the same track number as the triplet within one second of the Atime. However, an analysis may be made for a longer period.

Thus, for example if the track number (TNO) (of the next backward frame) is not one less than the track number (TNO) of the following frame (query box 264), the triplet is discarded (step 258). If the ADR/Ctrl field of the triplet has the data bit set but the frame does not have the corresponding data bit set, the bit is reset to audio. If the track number (TNO) is correct, the triplet is saved into a memory reconstruction of the TOC (step 266).

If an instance is incomplete (for example, if the A0–A2 items indicate more tracks or a longer disc than the reconstructed TOC), steps 254–266 are repeated for the next instance of the TOC.

Once a complete and valid TOC has been reconstructed, the discmay be read according to the reconstructed valid TOC.

Figure 33:
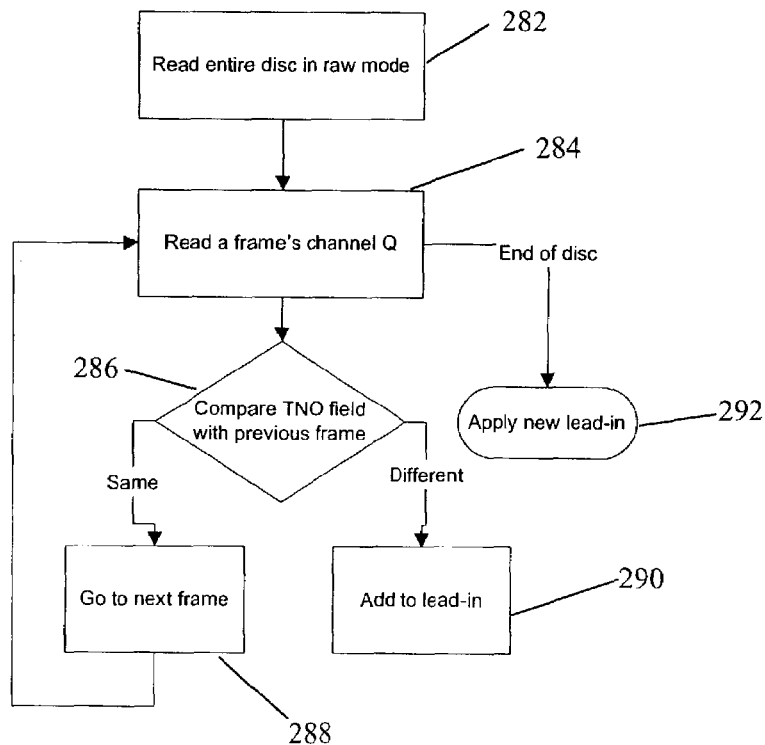
FIG. 33 is a flow-chart illustration of a further technique for creating a true lead-in, according to a further embodiment of the present invention.

In an alternative embodiment, the entire Program Area may be read in 2448-byte raw mode, thereby preserving the main channel and subchannel. Following the entire read, the channel Q may be analyzed using the algorithm illustrated in FIG. 33 to which reference is now made.

The entire disc is read in raw mode (step 282) and the channel Q of the frame is read (step 284). The track number (TNO) of the frame is compared with track number (TNO) of the previous frame (query box 286). If the track number (TNO) is the same as the previous track number (TNO), the next frame is then read (steps 288) and steps 284–286 are repeated. If the track number (TNO) is to greater than the previous frame, a TOC entry with the new track number and the ATime of the current frame is created I(step 290).

Steps 284–290 are then repeated until the end of the disc (step 292). Each track may then be interpreted from its image in the correct mode.

This document describes examples applying polymorphic lead-ins to the audio portion of an audio or multisession audio-data disc; however, all such examples are non-limiting.

While the invention has been described with respect to a limited number of embodiments, it will be appreciated that many variations, modifications and other applications of the invention may be made.

What is claimed is:

1. A method for determining the location of a table of contents (TOC) being read by an optical disc player, comprising: reading a calibration disc to determine the location of the TOC, being read by the optical disc player, of a plurality of TOCs on the calibration disc by reading the calibration disc a plurality of times using the optical disc player and determining the average, minimum, and maximum logical block addresses of the TOC being read to determine the location of the TOC.

2. An optical disc having a plurality of subcoding blocks comprising a continuous repetition of table of contents (TOCs), wherein each of said table of contents (TOCs) is different from at least one of the other continuous repetition of table of contents (TOCs), the absolute-time minutes (PM), absolute-time seconds (PS), and absolute-time frame (PF) fields of at least one of the three lead-out pointer items of at least one of said continuous repetition of TOCs is different from at least one of other three lead-out pointer items, and the PM, PS, and PF fields are equal to the track-time minutes (MI), track-time seconds (SE), and track-time frame (FR) fields bf one of said lead-out pointer items.

3. The optical disc according to claim 2 wherein the PM field is encoded with the minute and frame of the lead-in frame.

4. The optical disc according to claim 3, wherein PM= (frame/3)+((minute−97)*25).

5. The optical disc, according to claim 2, wherein the program area comprises a multitude of zones each of said multitude of zones having a predetermined time period.

6. The optical disc, according to claim 5, wherein each of said pre-determined time period is encoded as a series of modulated tones.

7. A method for protecting an optical disc from unauthorized copying, said method comprising the steps of: reading a calibration disc to determine the location of a table of contents (TOC), being read by a specific player, of a plurality of TOCs on the calibration disc by reading the calibration disc a plurality of times using the specific player and determining the average, minimum, and maximum logical block addresses of the TOC being read; and altering a TOC on the optical disc at the determined location, whereby the altered TOC has a different value from a corresponding item in at least one other of a plurality of TOCs on the optical disc.

* * * * *